United States Patent
Suzuki

(10) Patent No.: US 9,562,997 B2
(45) Date of Patent: Feb. 7, 2017

(54) OPTICAL SYSTEM, IMAGE DISPLAY DEVICE, AND IMAGING DEVICE

(75) Inventor: Kenzaburo Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 102 days.

(21) Appl. No.: 13/884,348

(22) PCT Filed: Oct. 19, 2011

(86) PCT No.: PCT/JP2011/005831
§ 371 (c)(1),
(2), (4) Date: May 9, 2013

(87) PCT Pub. No.: WO2012/063410
PCT Pub. Date: May 18, 2012

(65) Prior Publication Data
US 2013/0229705 A1  Sep. 5, 2013

(30) Foreign Application Priority Data
Nov. 12, 2010 (JP) .................... 2010-253478

(51) Int. Cl.
*G02B 5/18* (2006.01)
*G02B 27/01* (2006.01)

(52) U.S. Cl.
CPC ............... *G02B 5/18* (2013.01); *G02B 5/1814* (2013.01); *G02B 27/01* (2013.01)

(58) Field of Classification Search
CPC ............ G02B 27/0101; G02B 27/0103; G02B 27/017; G02B 27/0172; G02B 27/0174; G02B 2027/0105; G02B 2027/0116; G02B 5/0418; G02B 5/1814; G02B 5/1866; G02B 27/42; G02B 27/4205; G02B 27/4211
(Continued)

(56) References Cited

U.S. PATENT DOCUMENTS 5,016,977 A * 5/1991 Baude et al. ................ 359/570
5,191,485 A * 3/1993 Kahle ........................ G02B 5/04
                                                       355/45
(Continued)

FOREIGN PATENT DOCUMENTS

CN  1313958 A   9/2001
JP  09-258104 A  10/1997
(Continued)

OTHER PUBLICATIONS

Sultanova et al., "Dispersion Properties of Optical Polymers," Acta Physica Polonica A, vol. 116, No. 4, 2009, pp. 585-587.*

(Continued)

*Primary Examiner* — Stephone B Allen
*Assistant Examiner* — Adam W Booher
(74) *Attorney, Agent, or Firm* — Shapiro, Gabor and Rosenberger, PLLC

(57) ABSTRACT

This optical system (100) comprises a prism (12) and a diffractive optical element (13). The prism (12) has a non-rotationally-symmetric aspheric surface for correcting eccentric aberration, and the diffractive optical element (13) includes a diffractive optical surface (DM) having a lattice structure that is as about an optical axis (Ax) of the optical system (100). The following condition is satisfied where $\Delta Ne$ represents the refractive index difference of the diffractive optical surface (DM) in relation to the e-line (546.074 nm).

$$0.53 > \Delta Ne > 0.005 \qquad (1)$$

19 Claims, 13 Drawing Sheets

(58) Field of Classification Search
USPC .......... 359/13, 14, 558, 566, 567, 569–576, 618,359/629–640, 831, 833–837
See application file for complete search history.

(56) References Cited

U.S. PATENT DOCUMENTS

| | | | | |
|---|---|---|---|---|
| 5,701,202 | A * | 12/1997 | Takahashi | 359/631 |
| 5,768,025 | A | 6/1998 | Togino et al. | |
| 5,790,312 | A | 8/1998 | Togino et al. | |
| 5,995,291 | A | 11/1999 | Togino et al. | |
| 6,128,136 | A | 10/2000 | Togino et al. | |
| 6,181,475 | B1 | 1/2001 | Togino et al. | |
| 6,185,045 | B1 * | 2/2001 | Hanano | 359/631 |
| 6,396,639 | B1 | 5/2002 | Togino et al. | |
| 6,469,846 | B2 * | 10/2002 | Ebizuka et al. | 359/837 |
| 6,590,713 | B2 * | 7/2003 | Okuyama | 359/631 |
| 6,621,606 | B2 * | 9/2003 | Takeyama et al. | 359/15 |
| 6,636,356 | B2 | 10/2003 | Takeyama | |
| 6,687,057 | B1 | 2/2004 | Yamazaki | |
| 6,912,092 | B2 * | 6/2005 | Ukuda | 359/642 |
| 7,210,803 | B2 | 5/2007 | Matsunaga et al. | |
| 2001/0009478 | A1 * | 7/2001 | Yamazaki et al. | 359/630 |

FOREIGN PATENT DOCUMENTS

| | | |
|---|---|---|
| JP | 2001-142025 A | 5/2001 |
| JP | 2002-13965 A | 5/2002 |
| JP | 2002-311378 A | 10/2002 |
| JP | 2004-233907 A | 8/2004 |
| JP | 3559624 B2 | 9/2004 |
| WO | WO 2009/096389 A1 | 8/2009 |

OTHER PUBLICATIONS

Office Action issued Oct. 31, 2014, in Chinese Patent Application No. 201180054288.5.

* cited by examiner

OPTICAL SYSTEM, IMAGE DISPLAY DEVICE, AND IMAGING DEVICE

TECHNICAL FIELD

The present invention relates to an image display device, an imaging device, and an optical system having a free-shaped surface prism incorporated with a diffractive optical element.

TECHNICAL BACKGROUND

In recent years, aspheric surfaces that are not symmetric about an optical axis, i.e., "free-shaped surfaces", are beginning to be used. A free-shaped surface has freedom in terms of layout and freedom in terms of aberration correction unlike rotationally symmetric optical systems, and is therefore beneficial in making it possible to obtain a small and high-performance optical system. In particular, techniques relating to prisms having a free-shaped surface make it possible, with the progress in material and molding techniques for injection-molded glass and/or resin, to obtain a highly accurate shape, and therefore have a high potential for achieving a small, high-spec and high-performance optical system. However, the light-separating performance of the prism may result in chromatic aberration in the optical system.

Patent Document 1 discloses an optical system in which a diffractive optical element (DOE) is arranged between an eccentric prism having a free-shaped surface and the entrance pupil in order to correct chromatic aberration caused by the eccentric prism, whereby it is possible to correct residual chromatic aberration remaining in the unitary eccentric prism.

PRIOR ARTS LIST

Patent Document

Patent Document 1: Japanese Patent Publication No. 3559624(B2)

SUMMARY OF THE INVENTION

Problems to be Solved by the Invention

However, in the optical system disclosed in Patent Document 1, the refractive index difference of the diffractive optical element is 0.59, and manufacturing error sensitivity of the lattice is too large.

An object of the present invention is to provide a high-performance optical system in which chromatic aberration caused by the prism can be corrected in a more satisfactory manner.

Means to Solve the Problems

An optical system according to a first aspect comprises a prism and a diffractive optical element. The prism has a non-rotationally-symmetric aspheric surface for correcting eccentric aberration, and the diffractive optical element includes a diffractive optical surface having a lattice structure that is asymmetric about an optical axis of the optical system. The following condition is satisfied where $\Delta Ne$ represents the refractive index difference of the diffractive optical surface in relation to the e-line (546.074 nm).

$$0.53 > \Delta Ne > 0.005$$

An image display device according to a second aspect comprises the optical system according to the first aspect, and a display element for displaying an image guided and formed by the optical system.

An image display device according to a third aspect comprises the optical system, according to the first aspect, and an imaging element for imaging an image guided and formed by the optical system.

Advantageous Effects of the Invention

The present invention makes it possible to obtain a high-performance optical system in which chromatic aberration caused by the prism can be corrected in a more satisfactory manner.

DESCRIPTION OF THE EMBODIMENTS

First Embodiment

Overall Configuration of Optical System 100

Figure 1:
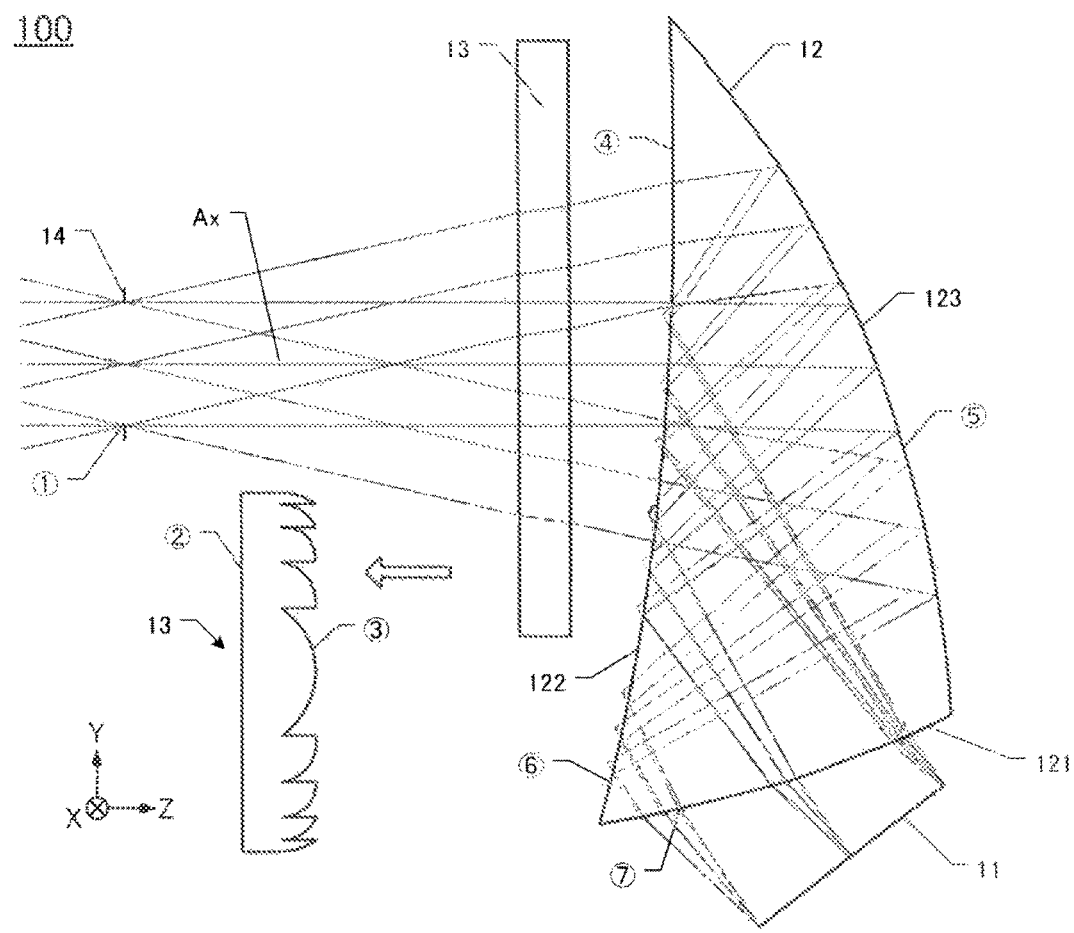
FIG. 1 is a side view of an optical system 100.

FIG. 1 is a side view showing the overall configuration of an optical system 100 according to a first embodiment. With reference to FIG. 1, a description will be given using the direction of the optical axis Ax of light incident on a stop 14 as the Z-axis direction, and the plane perpendicular to the Z-axis direction as the XY plane. An image element 11 and a stop 14 are drawn in FIG. 1 in order to aid comprehension; however, the image element 11 and the stop 14 are not included in the optical system 100. The image element 11 is an image display element such as a liquid crystal panel if, e.g., the optical system 100 is used in an image display device such as a projector (see FIG. 12). If, e.g., the optical system 100 is used in an imaging device such as a camera, the image element 11 is an imaging element such as a CCD (see FIG. 13).

As shown in FIG. 1, the optical system 100 is provided with an eccentric prism 12 comprising first through third surfaces 121-123, and a diffractive optical element 13 for correcting the chromatic aberration caused by the eccentric prism 12. The first through third surfaces 121-123 of the eccentric prism 12 are non-rotationally-symmetric aspheric surfaces, that are not symmetric about the optical axis Ax, for correcting eccentric aberration. The optical system 100 shown in FIG. 1 guides light generated in the image element 11 towards the stop 14 (see FIG. 12) or guides light entering from the stop 14 towards the image element 11 (see FIG. 13). The stop 14 is capable of adjusting the amount of light.

Figure 2A:
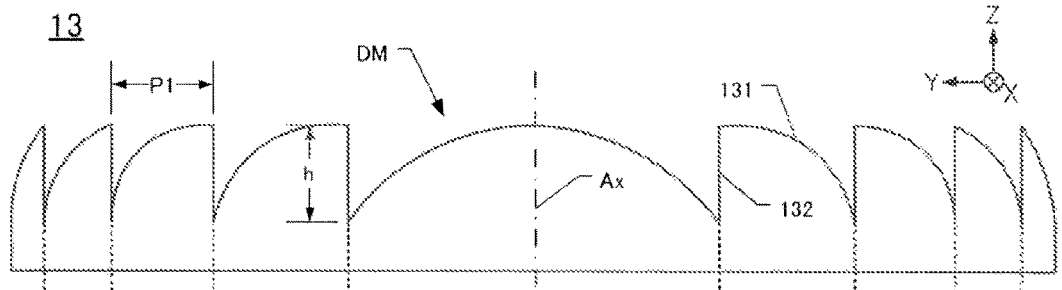
FIG. 2A is a schematic cross-section view of a diffractive optical element 13.
Figure 2B:
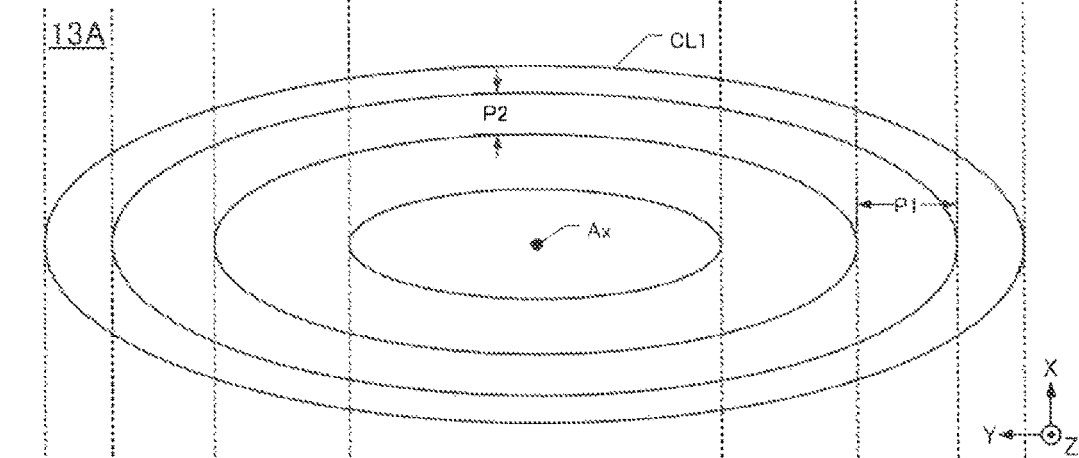
FIG. 2B is a plan view showing an example of the diffractive optical element 13 as viewed from the +Z side using contour lines CL1.
Figure 2C:
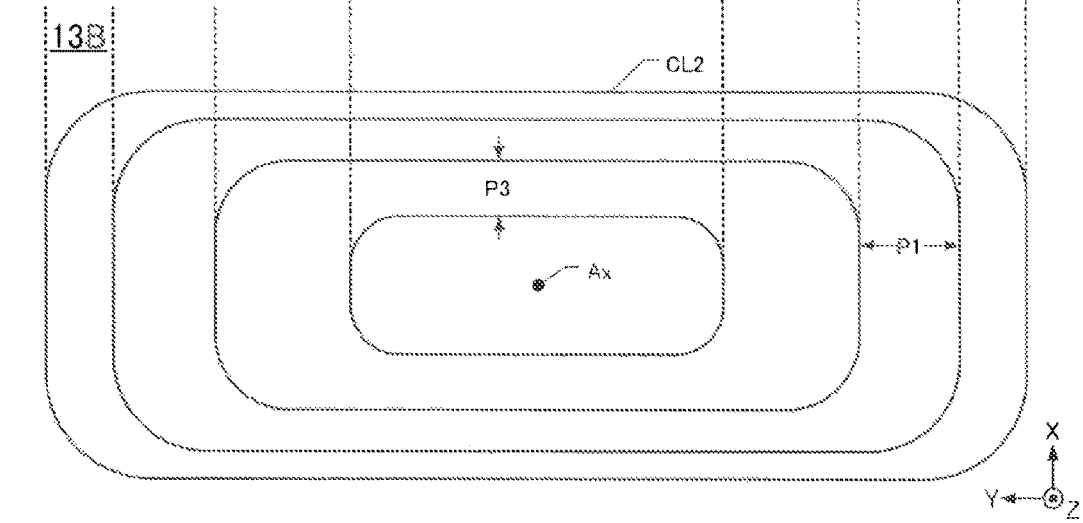
FIG. 2C is a plan view showing another example of the diffractive optical element 13 as viewed, from the +Z side using contour lines CL2.

FIG. 2A is a schematic cross-section view of the diffractive optical element 13; FIG. 2B is a plan view showing an example of the diffractive optical element 13 as viewed from the +Z side using contour lines CL1; and FIG. 2C is a plan view showing another example of the diffractive optical element 13 as viewed from the +Z side using contour lines CL2. The diffractive optical element 13 is of a single-layer type (surface relief type) comprising a UV-curing resin material or a glass material. As shown in FIG. 2A, the diffractive optical element 13 includes a kinoform-type diffractive optical surface DM having a continuous saw-tooth-shaped lattice structure. The diffractive optical surface DM has diffractive surfaces 131, which are outwardly bulging curved surfaces, and edge surfaces 132 extending in the Z-axis direction, formed at a pitch P1. The pitch P1 gradually narrows from the optical axis Ax towards the periphery. The height h of the edge surfaces 132 is uniform, irrespective of whether the edge surface 132 is towards the center or towards the periphery.

In FIG. 2A, the edge surfaces 132 are linear and parallel to the optical axis Ax. However, the edge surfaces 132 may be linear and inclined relative to the optical axis Ax, curved, or step-shaped. Having step-shaped edge surfaces results in flares generated by light having different wavelengths being more uniform.

As shown in FIG. 2B, the diffractive optical surface DM of the diffractive optical element 13A has a lattice structure that is asymmetric about the optical axis Ax from the image element 11 to the stop 14 (see FIG. 1). Specifically, when viewed in terms of base lines BL and contour lines CL1, the diffractive optical surface DM is elliptical with respect to the optical axis Ax. In the diffractive optical element 13A, the pitch P2 of the contour lines CL1 (i.e., the edge surfaces) gradually narrows from the optical axis Ax towards the periphery along the Y-axis direction as well. The power of the diffractive optical element 13A is weaker in the X-axis direction along which the intervals between the contour lines CL1 are larger, and the power of the diffractive optical element 13A is stronger in the Y-axis direction along which the intervals between the contour lines CL1 are smaller.

The diffractive optical element 13B shown in FIG. 2C is another example of a diffractive optical element 13. In FIG. 2C, the contour lines CL2 have a rounded rectangular shape, and the diffractive optical element 13B also has a lattice structure that is asymmetric about the optical axis Ax. In the diffractive optical element 13B, the pitch P3 of the contour lines CL2 (i.e., the edge surfaces) gradually narrows from the optical axis Ax towards the periphery along the Y-axis direction as well. The power of the diffractive optical element 13B is weaker in the X-axis direction along which the intervals between the contour lines CL1 are larger, and the power of the diffractive optical element 13B is stronger in the Y-axis direction along which the intervals between the contour lines CL1 are smaller.

The diffractive optical element 13 was described using the diffractive optical elements 13A and 13B shown in FIGS. 2B and 2C as examples; however, a variety of modifications are possible.

The following section again makes reference to FIG. 1. In the optical system 100, light generated by the image element 11 is refracted at a first surface 121 of the eccentric prism 12, and enters the eccentric prism 12. Then, the light is sequentially reflected by a second surface 122 and a third surface 123 of the eccentric prism 12, and is then incident again on the second surface 122 of the eccentric prism 12. The light is subsequently refracted at the second surface 122 of the eccentric prism 12 and exits from the eccentric prism 12. Light that has exited from the eccentric prism 12 passes through the diffractive optical element 13, upon which chromatic aberration caused by the eccentric prism 12 is corrected.

Overview of Optical System 100

<<Overview of Diffractive Optical Element 13>>

The diffractive optical element 13 preferably satisfies the condition shown in numerical relationship (1).

$$0.53 > \Delta Ne > 0.005 \tag{1}$$

Numerical relationship (1) defines an appropriate range of the refractive index difference $\Delta Ne$ of the diffractive optical surface DM of the diffractive optical element 13 with respect to the e-line (546.074 nm).

It is necessary that the refractive index of the diffractive optical element 13 differs between the two sides in the optical-axis Ax direction of the diffractive optical surface DM. In the diffractive optical element 13, e.g., the refractive index of the UV-curing resin, which is the material forming the diffractive optical element 13, is higher than that of air; therefore, the refractive index difference along the e-line between the refractive index of the UV-curing resin and the refractive index of air is $\Delta Ne$, More specifically, the upper limit value in numerical relationship (1) is preferably 0.53 in order to reduce the manufacturing error sensitivity.

If the upper limit value in numerical relationship (1) is exceeded, the refractive index difference $\Delta Ne$ will be too large, and the manufacturing error sensitivity of the diffractive optical element 13 will be too large. In order to maximize the effect associated with numerical relationship (1), it is more desirable for the upper limit value to be 0.2. Conversely, if the refractive index difference $\Delta Ne$ is lower than the lower limit value of numerical relationship (1), the refractive index difference $\Delta Ne$ will be too small, and it will be necessary to increase the height of the edge surfaces 132 of the diffractive optical element 13 (see FIG. 2A) in order to obtain the necessary diffraction. Therefore, if the refractive index difference $\Delta Ne$ is lower than the lower limit value of numerical relationship (1), there will be a disadvantage in terms of manufacturing the diffractive optical element 13, and the edge surfaces 132 will affect the incident light. There will also be a decrease in the diffraction efficiency with regards to blaze light, and an increase in stray light caused by scattering or reflection of incident light incident on the edge surfaces 132. Therefore, in order to maximize the effect associated with numerical relationship (1), it is more preferable that the lower limit value is 0.01.

The refractive power of the diffractive optical element 13 preferably satisfies the conditions shown in numerical relationships (2) and (3).

$$1\times10^{-1} > \Phi s/\Phi > 1\times10^{-7} \quad (2)$$

Numerical relationship (2) defines an appropriate range of ($\Phi s/\Phi$), where $\Phi s$ represents the refractive power of the diffractive optical element 13 in relation to the e-line in the direction along which the paraxial power is the strongest (the X-axis direction in FIG. 2), and $\Phi$ represents the refractive power in relation to the e-line of the optical system 100 as a whole.

If $\Phi s/\Phi$ exceeds the upper limit value of numerical relationship (2), the power will be too small, and there will be insufficient chromatic-Aberration-correction performance. Conversely, if $\Phi s/\Phi$ is smaller than the lower limit value of numerical relationship (2), there will be increased likelihood of a problem of the manufacturing error sensitivity of the lattice in the direction along which the power is the greatest being too large, and there will be a tendency of chromatic aberration correction being excessive, adversely affecting the image quality. In order to maximize the effect, the upper limit value of numerical relationship (2) is more preferably $1\times10^{-4}$, and the lower limit value is more preferably $1\times10^{-6}$.

$$5.0 > \Phi s/\Phi m > 1.02 \quad (3)$$

Numerical relationship (3) defines an appropriate range of ($\Phi s/\Phi m$), where $\Phi m$ represents the refractive power in relation to the e-line in the direction along which the paraxial power is the weakest (the X-axis direction in FIG. 2) of the diffractive optical element 13 having an lattice structure.

$\Phi s/\Phi m$ exceeding the upper limit value of numerical relationship (3) is disadvantageous in that the power difference will be too large, the difference in the appearance of chromatic aberration between the direction along which the paraxial power is stronger and the direction along which the paraxial power is weaker will be larger, and there will be a leek of balance in terms of aberration correction. Conversely, $\Phi s/\Phi m$ being smaller than the lower limit value of numerical relationship (3) will result in the power difference being too small and correction of chromatic aberration in different directions being insufficient, causing the image quality to be adversely affected. There will also be an increased likelihood of a problem of the manufacturing error sensitivity of the lattice in the direction along which the power is the greatest being too large. In order to maximize the effect, the upper limit value of numerical relationship (3) is preferably 3.0, and the lower limit value is preferably 1.05.

In the diffractive optical element 13, the amount of eccentricity preferably satisfies the condition shown in numerical relationship (4).

$$2.0 > \delta/fe > 0.001 \quad (4)$$

Numerical relationship (4) defines an appropriate range of ($\delta/fe$), where: $\delta$ represents the amount of eccentricity, relative to the optical axis Ax of the stop 14, of an optical axis of a cross-section of the diffractive optical element 13 along which the paraxial power is the strongest, the diffractive optical element 13 having an asymmetric lattice structure; and fe represents the focal distance in relation to the e-line.

If $\delta/fe$ exceeds the upper limit value of numerical relationship (4), the amount of eccentricity of the diffraction surface will be too large, the difference between spot sizes in the X-axis direction and the Y-axis direction will be too large, and it will not be possible to obtain an excellent image quality. A problem will also be presented in that machining will be more difficult. In order to maximize the effect, the upper limit value of numerical relationship (4) is preferably 0.95, and the lower limit value is preferably 0.003.

In the diffractive optical element 13, the diffraction efficiency preferably satisfies the condition shown in numerical relationship (5).

$$(Eg+EC)/(2\times Ee) > 0.8 \quad (5)$$

In numerical relationship (5), Ee represents the diffraction efficiency in relation to a principal wavelength (e-line: 546.074 nm), Eg represents the diffraction efficiency in relation to a wavelength smaller than the principal wavelength (g-line: 435.8 nm), and EC represents the diffraction efficiency in relation to a wavelength larger than the principal wavelength (C-line: 656.3 nm). Numerical relationship (5) defines an appropriate range of the balance in diffraction efficiencies when the bandwidth is increased.

If $(Eg+EC)/(2\times Ee)$ is lower than the lower limit value of numerical relationship (5), the diffraction efficiency will decrease at either the smaller or the larger wavelength, diffraction flare will increase, and stray light will be generated. In order to prevent stray light in a large-bandwidth visible light region, the lower limit value is preferably 0.9. In order to maximize the effect associated with numerical relationship (5), the lower limit is ideally 0.95. If the lower limit of numerical relationship (5) is 0.95, the amount of flare will be further reduced, and the optical system can be more readily used in a photography lens for which a highly defined image quality is required.

In order to achieve even better performance and specifications, the optical system 100 preferably satisfies the following numerical relationships (6) through (8).

$$-20.0 < \Delta Ne/\Delta(Ng-Nc) < -2.0 \quad (6)$$

In numerical relationship (6), Ng represents the refractive index in relation to the g-line (435.8 nm) of the diffractive optical element 13, and NC represents the refractive index in relation to the C-line (656.3 nm) of the diffractive optical element 13. $\Delta(Ng-Nc)$ represents, e.g., the difference in the main dispersion of the UV-curing resin, which has a low refractive index and a low dispersion, and air, which has a high refractive index and a high dispersion.

If $\Delta Ne/(Ng-Nc)$ exceeds the upper limit value of numerical relationship (6), a high refraction efficiency across a wide wavelength bandwidth cannot be obtained. Conversely, if $\Delta Ne/\Delta(Ng-Nc)$ is less than the lower limit value of the conditional relationship (6), a high refraction efficiency across a wide wavelength bandwidth similarly cannot be obtained. In order to obtain a sufficiently high refraction efficiency across a wide wavelength bandwidth, the lower limit value is preferably −8.0. Also, in order to maximize the effect, the upper limit value is preferably −2.8.

$$\Phi m/\Phi > 1\times10^{-7} \quad (7)$$

Numerical relationship (7) defines an appropriate range of ($\Phi m/\Phi$).

If ($\Phi m/\Phi$) is less than the lower limit value of numerical relationship (7), $\Phi m$ will become too strong in relation, and there will be an increased likelihood of a problem of excess chromatic aberration. In order to maximize the effect, the lower limit value is preferably $1\times10^{-5}$.

$$h/\lambda e < 100.0 \quad (8)$$

Numerical relationship (8) defines an appropriate range of ($h/\lambda e$), where h represents the height of the diffractive optical element 13 shown in FIG. 2A, and λe represents the wavelength of the e-line which corresponds to the reference wavelength.

h/λe exceeding the upper limit value of numerical relationship (8) presents a problem in that the height h of the edge surfaces 132 of the diffractive optical element 13 will be too large, the refraction efficiency in relation to light that is incident diagonally will decrease, and unnecessary flare will be generated. The height h of the edge surfaces 132 is the height along the direction of the angle of a principal light beam passing through the neighborhood of the edge surfaces, and is not limited to the height in the direction of the optical axis Ax. With regards to height h, the height in the direction of the optical axis is normally deemed to be the blaze height according to scalar theory, defined by the multiple of the refractive index difference and the center wavelength of design. However, in relation to light incident from a direction different from the direction of the optical axis, the blaze will not be optimal, and the diffraction efficiency will fall. Therefore, the height h of the edge surfaces 132 is the height along the direction of the angle of a principal light beam passing through the neighborhood of the edge surfaces.

In order to reduce the decrease in diffraction efficiency of blaze light and scattering due to the edge surfaces 132 of the diffractive optical element 13, it is preferable that the edge surfaces 132 are imparted with a gradient towards the stop 14, and tilted. Specifically, it is preferable that the edge surfaces 132 are imparted with a gradient along the principal light beam. In other words, the edge surfaces 132 are oriented towards the stop 14. Also, a manufacturing method in which the diffractive optical element 13 is formed by resin shaping using a mold is preferred, partly because the cost can be reduced. It is further preferable that the edge surface portions have a step-shaped or a rough-surface structure for preventing regular reflection, which will reduce stray light. In order to maximize the effect, the upper limit value is preferably 50.0.

It is preferable that the following conditions are satisfied in terms of actually building the optical system 100. When the eccentric prism 12 is being built, the eccentric prism 12 is preferably created by injection molding using a resin or molding glass. In order to minimize birefringence caused by internal strain such as in an optical system for a high-definition image, injection molding using molding glass is preferred. Forming the glass or the resin using a mold is also beneficial in that the machining and manufacturing will be facilitated and the cost can be reduced.

Forming the diffractive optical element 13 using a UV-curing resin will improve the robustness of production, and is therefore preferred in terms of production. This will make it possible to reduce the workload and cost, and is beneficial. In order to reduce the size and cost, it is preferable that the optical material forming the diffractive optical element 13 is a resin material having a specific gravity of no more than 2.0. A resin has a smaller relative gravity than glass, and is therefore effective for reducing the weight of the optical system. In order to further enhance the effect, the relative gravity is preferably no more than 1.6. In spite that the refractive power of the diffractive optical element 13 is positive or negative, it is important that the peak side of the high refractive index is made sharper in order to minimize the decrease in the diffraction efficiency during manufacture. In other words, in the instance of negative power, the refractive index must be lower at the side nearer the stop 14.

The phase polynomial, which determines the shape of the diffractive optical surface of the diffractive optical element 13 is as shown in the following numerical relationship (9).

[Equation 1]

$$z = \sum_{j=1} C_j x^m y^n \quad (9)$$

In numerical relationship (9), j, m, and n satisfy the following numerical relationship (10).

$$j = [(m+n)^2 + m + 3n]/2 \quad (10)$$

In other words, the coefficient of $X^2$ is $C_3$, the coefficient of $Y^2$ is $C_5$, the coefficient of $X^4$ is $C_{10}$, and the coefficient of $Y^4$ is $C_{14}$.

<<Overview of Eccentric Prism 12>>

The phase polynomial, which determines the shape of the first through third surfaces 121-123, which are non-rotationally-symmetric aspheric surfaces for correcting the eccentricity aberration in the eccentric prism 12 is as shown in the following numerical relationship (11).

[Equation 2]

$$z = ch^2 / \{1 + [1 - c^2(k+1)h^2]^{1/2}\} + \sum_{j=2} C_j x^m y^n \quad (11)$$

Here, z represents the amount of sag of a surface parallel to the optical axis Ax, c represents the surface vertex (on the optical axis Ax) curvature; h represents the distance from the optical axis Ax; and k represents the conic coefficient.

In numerical relationship (11), j, m, and n satisfy the following numerical relationship (12).

$$j = [(m+n)^2 + m + 3n]/2 + 1 \quad (12)$$

In other words, the coefficient of $X^2$ is $C_4$, the coefficient of $Y^2$ is $C_6$, the coefficient of $X^2Y$ is $C_8$, the coefficient of $y^3$ is $C_{10}$, the coefficient of $X^4$ is $C_{11}$, the coefficient of $X^2Y^2$ is $C_{13}$, the coefficient of $Y^4$ is $C_{15}$, the coefficient of $X^4Y$ is $C_{17}$, the coefficient of $X^2Y^3$ is $C_{19}$, and the coefficient of $Y^5$ is $C_{21}$.

<Specific Example of Optical System 100>

Data representing the surface of the diffractive optical element 13 and the eccentric prism 12 forming the optical system 100 is as shown in Table 1. In Table 1, the surface numbers are in reference to FIG. 1.

TABLE 1

| SURFACE NUMBER | RADIUS OF CURVATURE | SURFACE DISTANCE | ECCENTRICITY | REFRACTIVE INDEX | | |
|---|---|---|---|---|---|---|
| | | | | g-LINE | c-LINE | e-LINE |
| OBJECT | ∞ | ∞ | — | | | |
| ① | ∞ | 15.0000 | — | | | |
| ② | ∞ | 2.0000 | — | 1.526685 | 1.514322 | 1.518722 |
| ③ | ∞ | 3.6814 | — | | | |

TABLE 1-continued

| SURFACE NUMBER | RADIUS OF CURVATURE | SURFACE DISTANCE | ECCEN-TRICITY | REFRACTIVE INDEX | | |
|---|---|---|---|---|---|---|
| | | | | g-LINE | c-LINE | e-LINE |
| ④ | −91.0742 FFS[1] | | ECCEN-TRICITY(1) | 1.526685 | 1.514322 | 1.518722 |
| ⑤ | −42.2454 FFS[2] | | ECCEN-TRICITY(2) | 1.526685 | 1.514322 | 1.518722 |
| ⑥(④) | −91.0742 FFS[1] | | ECCEN-TRICITY(1) | 1.526685 | 1.514322 | 1.518722 |
| ⑦ | −14.6424 FFS[3] | 1.4668 | ECCEN-TRICITY(3) | | | |
| IMAGE | ∞ | | ECCEN-TRICITY(4) | | | |

The polynomial FFS[1] shown in Table 1 is a numerical relationship (11) determining the shape of the second surface 122, which is an aspheric surface of the eccentric prism 12. Table 2 shows the coefficients of numerical relationship (11) relating to the second surface 122.

TABLE 2

| C4 | −0.00260460069429 |
| C6 | 0.0011413572285 |
| C8 | −0.249288022295 × $10^{-4}$ |
| C10 | 0.217641632656 × $10^{-4}$ |
| C11 | −0.620447183907 × $10^{-5}$ |
| C13 | −0.307152033272 × $10^{-5}$ |
| C15 | −0.108279606677 × $10^{-5}$ |
| C17 | 0.929921373917 × $10^{-6}$ |
| C19 | 0.331741247354 × $10^{-6}$ |
| C21 | 0.499317344308 × $10^{-7}$ |

Similarly, the polynomial FFS[2] is a numerical relationship (11) determining the shape of the third surface 123, which is an aspheric surface of the eccentric prism 12. Table 3 shows the coefficients of numerical relationship (11) relating to the third surface 123.

TABLE 3

| C4 | −0.00108113563583 |
| C6 | 0.000779202297011 |
| C8 | −0.37375205533 × $10^{-4}$ |
| C10 | −0.308653118589 × $10^{-4}$ |
| C11 | −0.335771552873 × $10^{-5}$ |
| C13 | −0.351052828936 × $10^{-5}$ |
| C15 | −0.544064599067 × $10^{-6}$ |
| C17 | 0.161624698176 × $10^{-6}$ |
| C19 | −0.422047439642 × $10^{-7}$ |
| C21 | 0.207996765958 × $10^{-7}$ |

Similarly, the polynomial FFS[3] is a numerical relationship (11) determining the shape of the first surface 121, which is an aspheric surface of the eccentric prism 12. Table 4 shows the coefficients of numerical relationship (11) relating to the first surface 121.

TABLE 4

| C4 | 0.0385031542161 |
| C6 | 0.0236124588352 |
| C8 | 0.00261079774853 |
| C10 | 0.000274678876742 |
| C11 | 0.893560064743 × $10^{-4}$ |
| C13 | 0.000566042251769 |
| C15 | 0.15697908303 × $10^{-4}$ |
| C17 | −0.277198389115 × $10^{-4}$ |
| C19 | 0.207462100627 × $10^{-4}$ |
| C21 | −0.598273618419 × $10^{-5}$ |

In Table 1, eccentricity (1) represents the eccentricity parameter of the second surface 122 of the eccentric prism 12. As shown in Table 5, the eccentricity parameter includes data representing eccentricity along X, Y, and Z, and eccentricity data representing α, β, and γ rotations.

TABLE 5

| X | 0.0 | α | −4.04053871865 |
| Y | −1.1160119198 | β | 0.0 |
| Z | 0.0 | γ | 0.0 |

Similarly, eccentricity (2) represents the eccentricity parameter of the third surface 123 of the eccentric prism 12, and the parameters are shown in Table 6.

TABLE 6

| X | 0.0 | α | 20.8816676806 |
| Y | 0.35411285394 | β | 0.0 |
| Z | 7.9 | γ | 0.0 |

Similarly, eccentricity (3) represents the eccentricity parameter of the first surface 121 of the eccentric prism 12, and the parameters are shown in Table 7.

TABLE 7

| X | 0.0 | α | −69.1243297148 |
| Y | −15.1030603893 | β | 0.0 |
| Z | 6.97486591823 | γ | 0.0 |

Similarly, eccentricity (4) represents the eccentricity parameter when an image is formed on the image element 11, and the parameters are shown in Table 8.

TABLE 8

| X | 0.0 | α | 16.3625164085 |
| Y | −1.23762852278 | β | 0.0 |
| Z | 0.0 | γ | 0.0 |

The shape of the diffractive optical surface of the diffractive optical element 13 shown in Table 1 is determined by numerical relationship (9), and the coefficients thereof are as shown in Table 9.

TABLE 9

| C3 | −0.00032 |
| C5 | −0.00028 |
| C10 | 0.103 × $10^{-5}$ |
| C14 | 0.8 × $10^{-6}$ |

The specific values relating to numerical relationships (1) through (8) obtained using the above-mentioned data are as shown in Table 10.

TABLE 10

| | |
|---|---|
| fe | 18.8676 |
| Φs | 3.49487 × 10⁻⁷ |
| Φm | 3.05801 × 10⁻⁷ |
| δ | 2.0 |
| Eg | 0.98594 |
| EC | 0.98375 |
| Ee | 0.99563 |
| h(μm) | 1.05273 |
| λe(μm) | 0.546074 |
| Φ(=1/fe) | 0.0530 |

According to the conditional values in Table 10, the calculation results relating to numerical relationships (1) through (8) are as shown in Table 11. The optical system 100 satisfies the conditions shown in numerical relationships (1) through (8) as shown in Table 11.

TABLE 11

| NUMERICAL RELATIONSHIP(1) | ΔNe | 0.51872 |
|---|---|---|
| NUMERICAL RELATIONSHIP(2) | Φs/Φ | 6.594 × 10⁻⁶ |
| NUMERICAL RELATIONSHIP(3) | Φs/Φm | 1.1429 |
| NUMERICAL RELATIONSHIP(4) | δ/fe | 0.106 |
| NUMERICAL RELATIONSHIP(5) | (Eg + EC)/(2 × Ee) | 0.98917 |
| NUMERICAL RELATIONSHIP(6) | ΔNe/Δ(Ng − NC) | −6.1522 |
| NUMERICAL RELATIONSHIP(7) | Φm/Φ | 3.144 × 10⁻⁶ |
| NUMERICAL RELATIONSHIP(8) | h/λe | 1.9278 |

Figure 3:
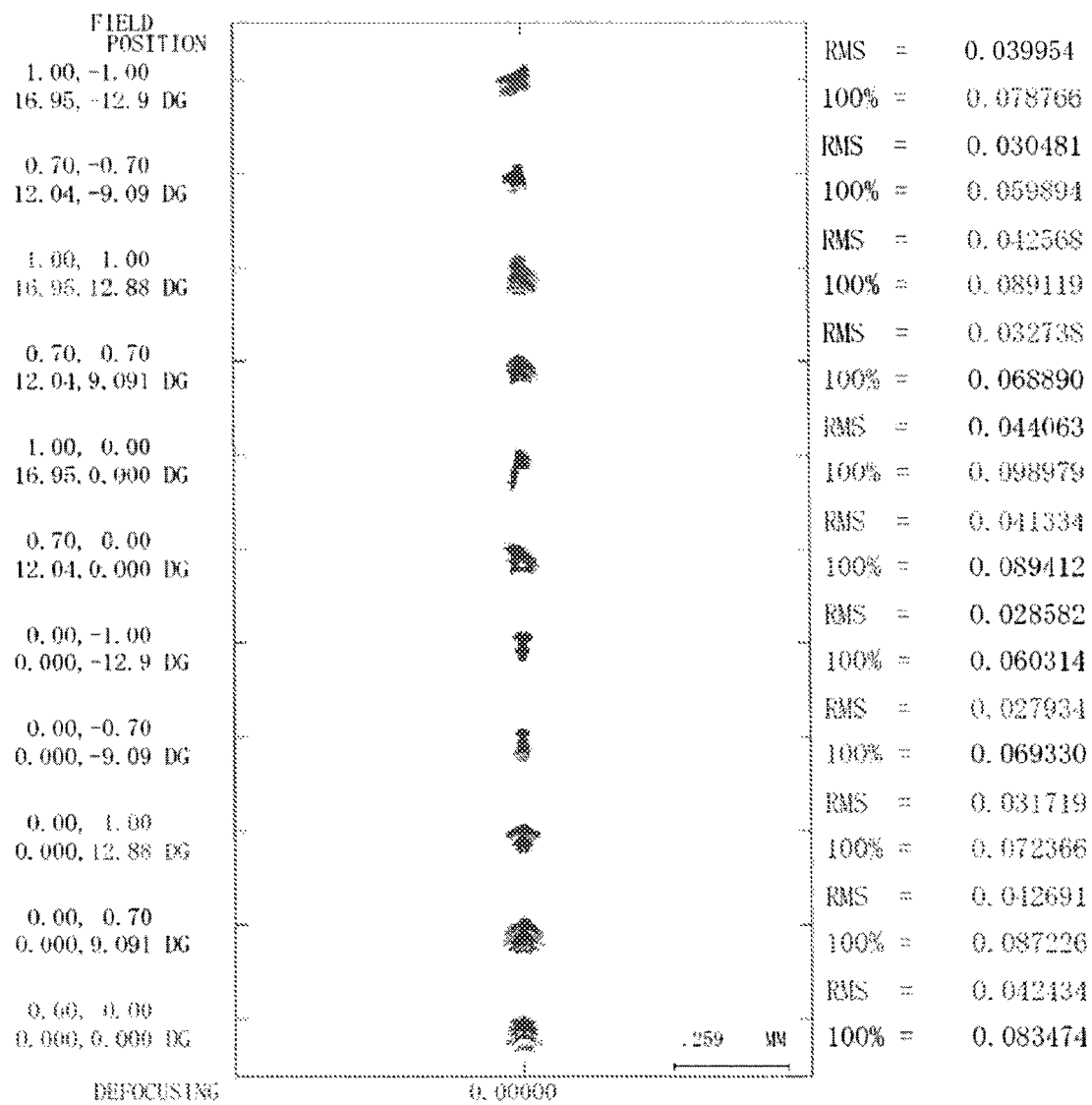
FIG. 3 is a spot diagram showing the state of aberration correction according to the first embodiment.

FIG. 3 is a spot diagrams, showing the state of aberration correction according to the first embodiment. In FIG. 3, from amongst the four numbers to the left of the spot diagram, the two numbers on the top row represent relative coordinates (X, Y) expressed so that the coordinates (X, Y) at the center of a rectangular screen are (0.00, 0.00), the coordinates at the center of the right edge are (0.00, −1.00), the coordinates at the top right corner are (1.00, −1.00), and the coordinates at the center of the top edge are (1.00, 0.00). The two numbers on the bottom row represent the X-component and the Y-component (in degrees) of the angle between the above coordinates (X, Y) and the visual axis (center of the screen).

As shown in FIG. 3, the diffractive optical element 13 sufficiently corrects the chromatic aberration generated on the transmission surfaces (first surface 121 and second surface 122) of the eccentric prism 12.

Second Embodiment

Overall Configuration of Optical System 200

Figure 4:
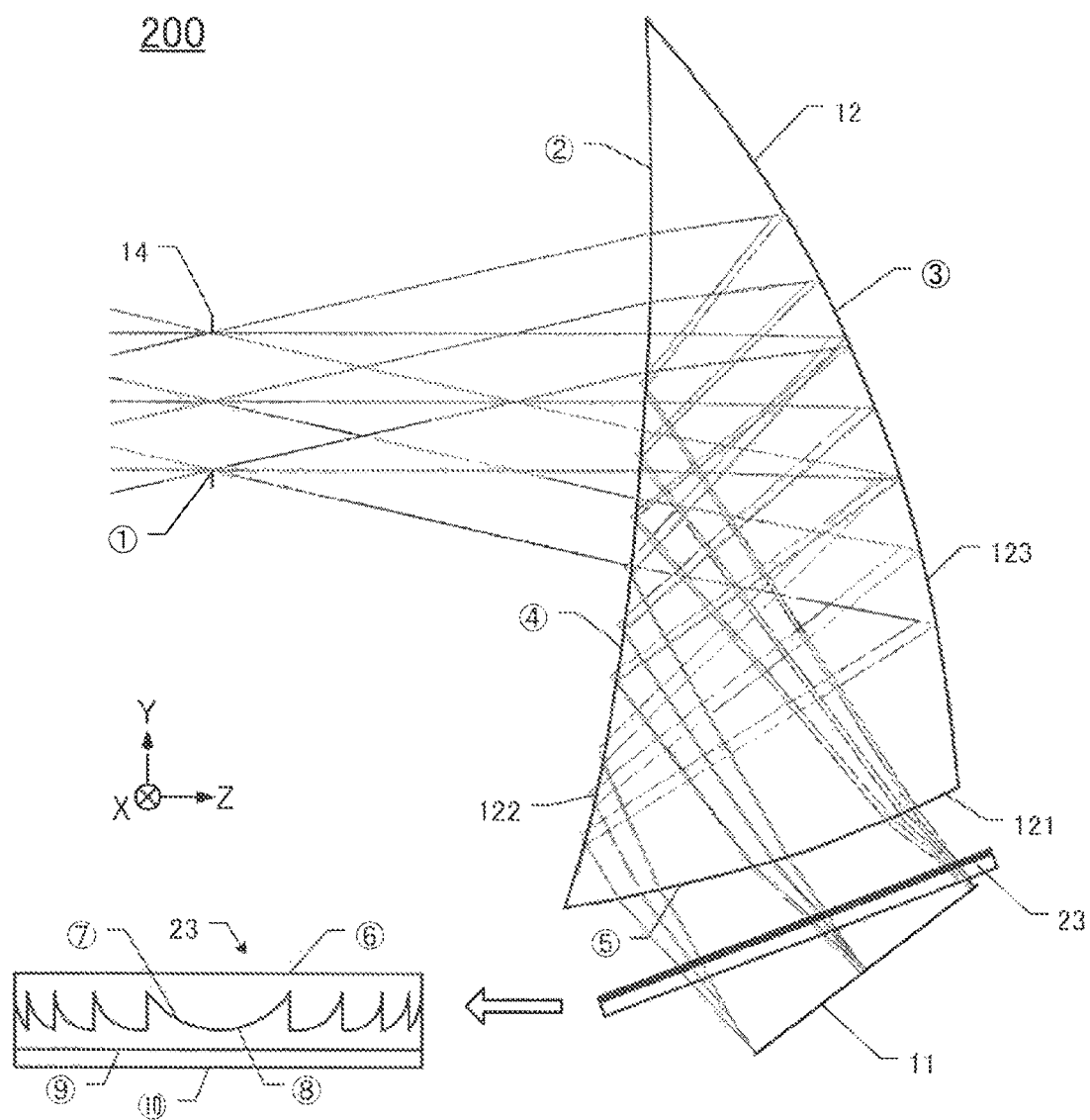
FIG. 4 is a side view of the optical system 200 according to the second embodiment.
Figure 5:
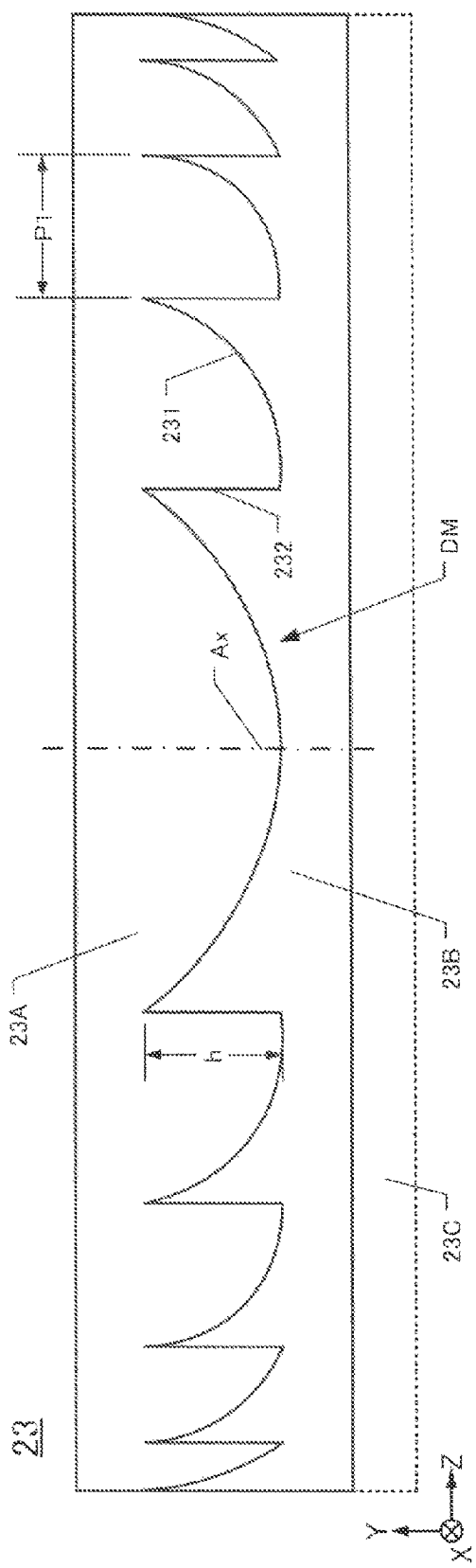
FIG. 5 is a schematic cross-section view of a diffractive optical element 23.

The configuration of an optical system 200 according to the second embodiment will now be described with reference to FIGS. 4 and 5. FIG. 4 is a side view of the optical system 200 according to the second embodiment, and FIG. 5 is a schematic cross-section view of a diffractive optical element 23. The image element 11 is not included in the optical system 200, but is illustrated in order to aid comprehension. Constituent elements described in the first embodiment are described using identical affixed numerals.

As shown in FIG. 4, the diffractive optical element 23 is arranged diagonally between the image element 11 and the eccentric prism 12. In the second embodiment, the diffractive optical element 23 is of a multilayer type, as shown in FIG. 5. The diffractive optical element 23 shown in FIG. 4 is arranged diagonally with respect to the coordinate system; in order to aid comprehension, the coordinate system used in FIG. 5 is the same as that used in FIG. 4. In FIG. 5, the −Y side is the image element 11, and the +Y side is the eccentric prism 12.

As shown in FIG. 5, the diffractive optical element 23 is obtained by bringing a first diffraction grating 23A and a second diffraction grating 23B into intimate contact with each other. The diffractive optical element 23 is rectangular as a whole, and the shape of the first diffraction grating 23A is identical to that of the diffractive optical element 13 described in the first embodiment. A diffractive optical surface DM is formed between the first diffraction grating 23A and the diffraction grating 23B. The diffractive optical surface DM has diffractive surfaces 231, which are outwardly bulging curved surfaces, and edge surfaces 232 extending in the Y-axis direction, formed at a pitch P1. The pitch P1 gradually narrows from the optical axis Ax towards the periphery. The height h of the edge surfaces 232 is uniform. Although the edge surfaces 232 are linear, they may be step-shaped or curved. Having step-shaped edge surfaces results in flares generated by light having different wavelengths being more uniform.

The diffractive optical surface DM of the diffractive optical element 23 has a lattice structure that is asymmetric about the optical axis Ax from the image element 11 to the stop 14 (see FIG. 4). In other words, when viewed using the base lines BL and the contour lines CL1, CL2 as shown in FIGS. 2B and 2C of the first embodiment, the diffractive optical surface DM has an elliptical or a rounded rectangular shape relative to the optical axis Ax.

In the diffractive optical element 23, the first diffraction grating 23A on the side towards the eccentric prism 12 has a higher refractive index, and the second diffraction grating 23B on the side towards the image element 11 has a lower refractive index. The refractive index of the first diffraction grating 23A in relation to the C-line, the e-line, and the g-line is 1.5713, 1.5598, and 1.5538 respectively. The refractive index of the second diffraction grating 23B in relation to the C-line, the e-line, and the g-line is 1.5491, 1.5315, and 1.5233 respectively.

With regards to the diffractive optical element 23, in order to maintain a good molding performance and obtain an excellent mass productivity, the viscosity of the material forming the first diffraction grating 23A (viscosity before curing) is preferably no less than 40 mPa·s. The viscosity being less than 40 mPa·s will make the resin flow more readily during molding, result in a problem of it being more difficult to mold a precise shape. The viscosity of the material forming the second diffraction grating 23B is preferably no less than 2000 mPa·s.

Forming all of the optical members forming the diffractive optical element 23 from a UV-curing resin will increase robustness of production, and is therefore preferred in terms of production. This will make it possible to reduce the workload and cost, and is beneficial.

In order to reduce the size and cost, it is preferable that the optical material forming the diffractive optical element 23 is a resin material having a specific gravity of no more than 2.0. A resin has a smaller relative gravity than glass, and is therefore effective for reducing the weight of the optical system. In order to further enhance the effect, the relative gravity is preferably no more than 1.6.

Whether the refractive power of the diffractive optical element 13 is positive or negative, it is important that the hill side of the high refractive index is sharper in order to minimize the decrease in the diffraction efficiency during manufacture. In other words, in the instance of diverging power, the refractive index must be lower nearer the stop 14.

As shown in FIG. 5, the diffractive optical element 23 also has a plate-shaped glass plate 23C, illustrated using a dotted line on the −Y side of the second diffraction grating 23B.

Specific Example of Optical System 200

Data representing the surface of the diffractive optical element 23 and the eccentric prism 12 forming the optical system 200 is as shown in Table 12. In Table 12, the surface numbers are in reference to FIG. 4.

TABLE 12

| SURFACE NUMBER | RADIUS OF CURVATURE | SURFACE DISTANCE | ECCEN-TRICITY | REFRACTIVE INDEX | | |
|---|---|---|---|---|---|---|
| | | | | g-LINE | c-LINE | e-LINE |
| OBJECT | ∞ | ∞ | — | | | |
| ① | ∞ | 15.0000 | — | | | |
| ② | −91.0742 FFS[1] | | ECCEN-TRICITY(1) | 1.526685 | 1.514322 | 1.518722 |
| ③ | −42.2454 FFS[2] | | ECCEN-TRICITY(2) | 1.526685 | 1.514322 | 1.518722 |
| ④(②) | −91.0742 FFS[1] | | ECCEN-TRICITY(1) | 1.526685 | 1.514322 | 1.518722 |
| ⑤ | −14.6424 FFS[3] | 2.0000 | ECCEN-TRICITY(3) | | | |
| ⑥ | ∞ | 0.1000 | — | 1.5713 | 1.5538 | 1.5598 |
| ⑦ | ∞ | 0.0000 | — | | | |
| ⑧ | ∞ | 0.1000 | — | 1.5491 | 1.5233 | 1.5315 |
| ⑨ | ∞ | 0.5000 | — | | | |
| ⑩ | ∞ | 1.7960 | — | | | |
| IMAGE | ∞ | | ECCEN-TRICITY(4) | | | |

The coefficients of the polynomials FFS[1]-FFS[3] shown in Table 12 are as shown in Tables 2, 3, and 4 used to describe the first embodiment, respectively. Eccentricities (1) through (4) are as shown in Tables 5, 6, 7, and 8 used to describe the first embodiment, respectively.

The shape of the diffractive optical surface of the diffractive optical element 23 shown in Table 4 is determined by numerical relationship (9), and the coefficients are as shown in Table 13.

TABLE 13

| C3 | −0.0009 |
|---|---|
| C5 | −0.0015 |

The specific values of the parameters relating to numerical relationships (1) through (8) used to describe the first embodiment obtained using the above-mentioned parameters are as shown in Table 14.

TABLE 14

| fe | 19.1925 |
|---|---|
| $\Phi s$ | $1.63822 \times 10^{-6}$ |
| $\Phi m$ | $9.82933 \times 10^{-7}$ |
| $\delta$ | 0.1 |
| Eg | 0.98594 |
| EC | 0.98375 |

TABLE 14-continued

| Ee | 0.99563 |
|---|---|
| h(μm) | 20.000 |
| λe(μm) | 0.546074 |
| $\Phi(=1/fe)$ | 0.0521 |

According to the conditional values shown in Table 14, the calculation results relating to numerical relationships (1) through (8) are as shown in Table 15. The optical system 200 satisfies the conditions in numerical relationships (1) through (8) as shown in Table 15.

TABLE 15

| NUMERICAL RELATIONSHIP(1) | ΔNe | 0.0283 |
|---|---|---|
| NUMERICAL RELATIONSHIP(2) | $\Phi s/\Phi$ | $3.144 \times 10^{-5}$ |

TABLE 15-continued

| NUMERICAL RELATIONSHIP(3) | $\Phi s/\Phi m$ | 1.66666 |
|---|---|---|
| NUMERICAL RELATIONSHIP(4) | $\delta/fe$ | 0.00521 |
| NUMERICAL RELATIONSHIP(5) | $(Eg + EC)/(2 \times Ee)$ | 0.98917 |
| NUMERICAL RELATIONSHIP(6) | $\Delta Ne/\Delta(Ng - NC)$ | −6.1522 |
| NUMERICAL RELATIONSHIP(7) | $\Phi m/\Phi$ | $1.886 \times 10^{-5}$ |
| NUMERICAL RELATIONSHIP(8) | $h/\lambda e$ | 36.625 |

Figure 6:
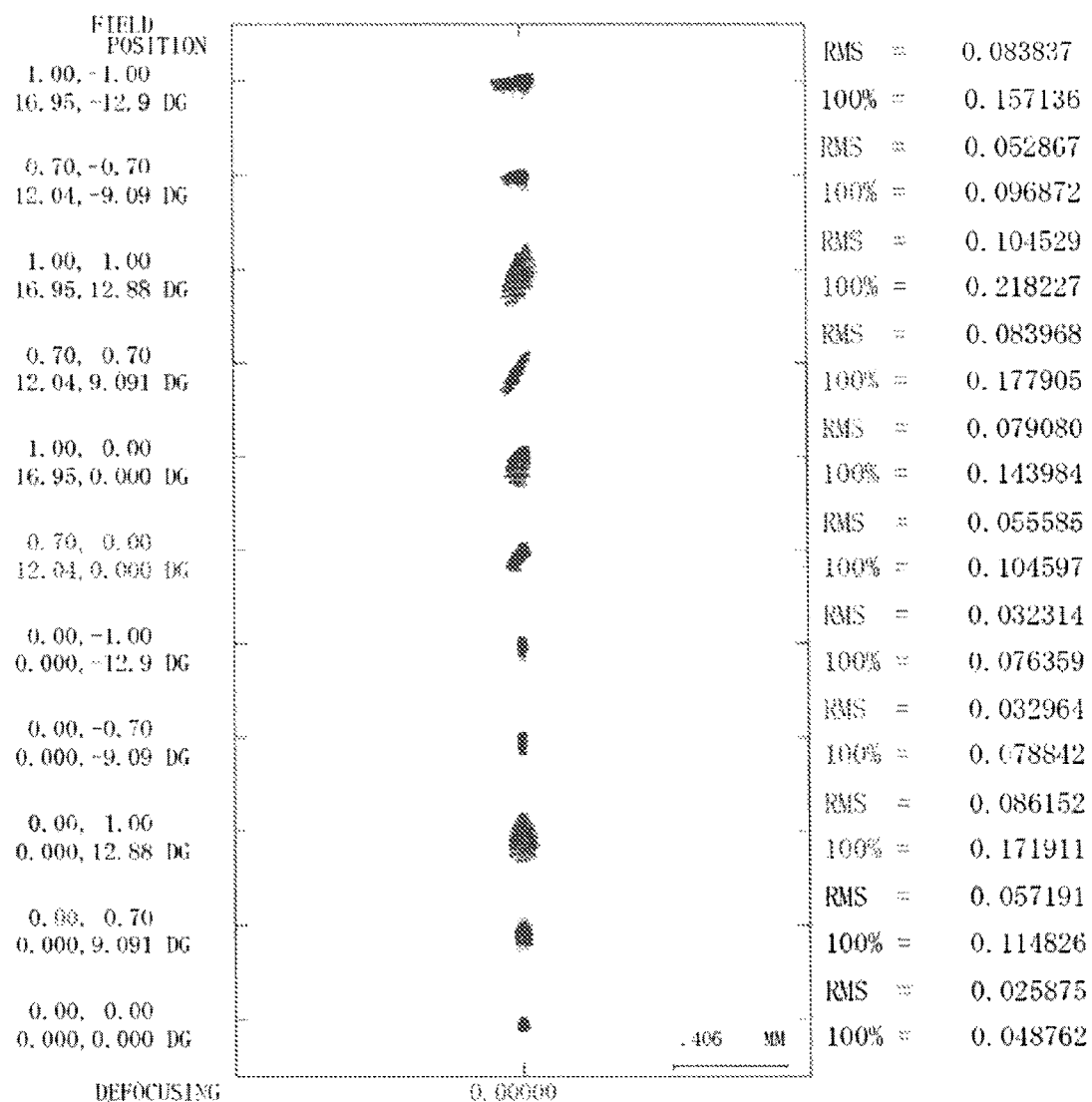
FIG. 6 is a spot diagram showing the state of aberration correction according to the second embodiment.

FIG. 6 is a spot diagram showing the state of aberration correction according to the second embodiment. As shown in FIG. 6, the diffractive optical element 23 sufficiently corrects the chromatic aberration generated on the transmission surfaces (first surface 121 and second surface 122) of the eccentric prism 12.

Third Embodiment

Overall Configuration of Optical System 300

Figure 7:
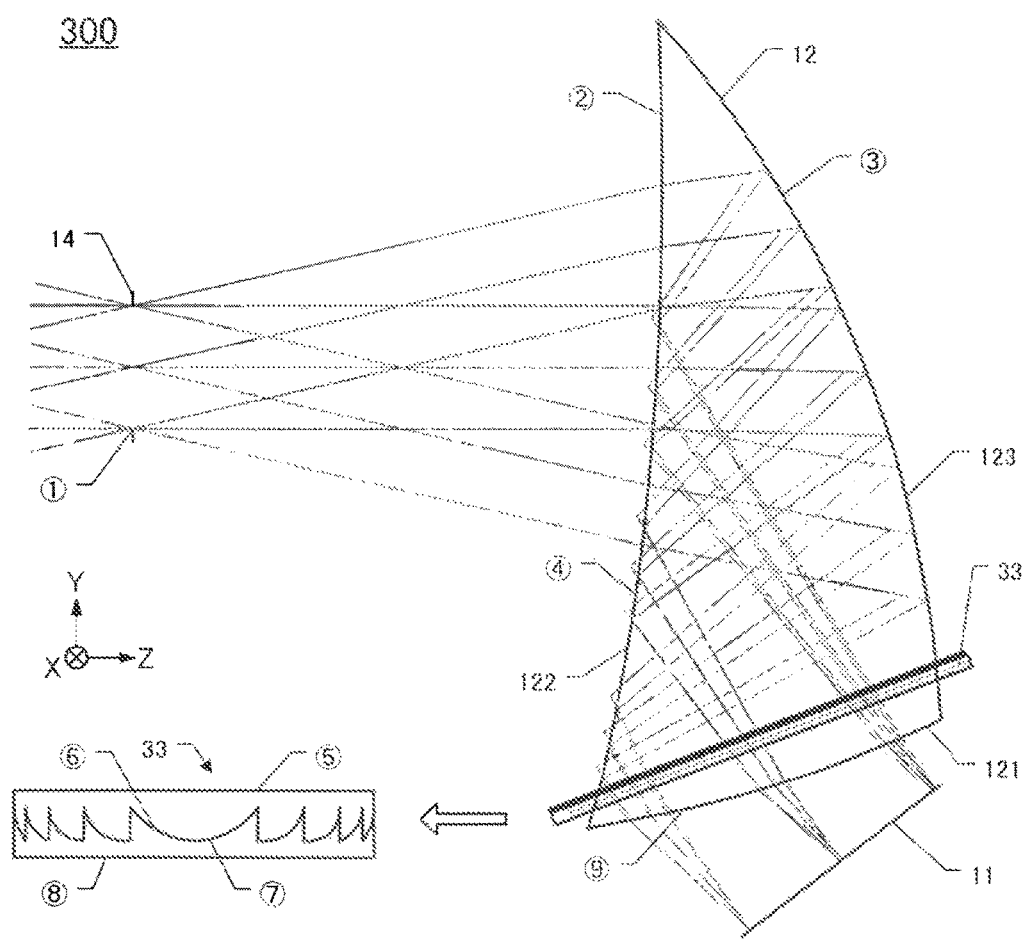
FIG. 7 is a side view of the optical system 300 according to the third embodiment.

The configuration of an optical system 300 according to a third embodiment will now be described with reference to FIG. 7. FIG. 7 is a side view of the optical system 300 according to the third embodiment. The image element 11 is not included in the optical system 300, but is illustrated in order to aid comprehension. Constituent elements described in the first embodiment are described using identical affixed numerals.

As shown in FIG. 7, the prism 12 consists of only a single piece of material, and a diffractive optical element 33 is arranged diagonally within the eccentric prism 12. The diffractive optical element 33 is of a multilayer type obtained by bringing two diffraction gratings into intimate contact with each other, similar to the diffractive optical element 23 described in the second embodiment. However, the diffractive optical element 33 does not have the glass plate 23C indicated by a dotted line in FIG. 5 of the second embodiment. In the diffractive optical element 33, the side towards the image element 11 is a diffraction grating having a lower refractive index, and the side towards the stop 14 is a diffraction grating having a higher refractive index.

Specific Example of Optical System 300

Data representing the surface of the diffractive optical element 33 and the eccentric prism 12 forming the optical system 300 is as shown in Table 16. In Table 16, the surface numbers are in reference to FIG. 7.

TABLE 16

| SURFACE NUMBER | RADIUS OF CURVATURE | SURFACE DISTANCE | ECCEN-TRICITY | REFRACTIVE INDEX | | |
|---|---|---|---|---|---|---|
| | | | | g-LINE | c-LINE | e-LINE |
| OBJECT | ∞ | ∞ | — | | | |
| ① | ∞ | 20.0000 | — | | | |
| ② | −91.0742 FFS[1] | | ECCEN-TRICITY(1) | 1.526685 | 1.514322 | 1.518722 |
| ③ | −42.2454 FFS[2] | | ECCEN-TRICITY(2) | 1.526685 | 1.514322 | 1.518722 |
| ④(②) | −91.0742 FFS[1] | | ECCEN-TRICITY(1) | 1.526885 | 1.514322 | 1.518722 |
| ⑤ | ∞ | 0.2000 | ECCEN-TRICITY(5) | 1.5713 | 1.5538 | 1.5598 |
| ⑥ | ∞ | 0.0000 | ECCEN-TRICITY(6) | | | |
| ⑦ | ∞ | 0.2000 | ECCEN-TRICITY(6) | 1.5491 | 1.5233 | 1.5315 |
| ⑧ | ∞ | | ECCEN-TRICITY(7) | 1.526685 | 1.514322 | 1.518722 |
| ⑨ | −14.6424 FFS[3] | 1.4970 | ECCEN-TRICITY(3) | | | |
| IMAGE | ∞ | | ECCEN-TRICITY(4) | | | |

The coefficients of the polynomials FFS[1]-FFS[3] shown in Table 13 are as shown in Tables 2, 3, and 4 used to describe the first embodiment, respectively. Eccentricities (1) through (4) are as shown in Tables 5, 6, 7, and 8 used to describe the first embodiment, respectively.

In the third embodiment, each of the surfaces of the diffractive optical element 33 is also an eccentric surface. For example, the eccentricity parameters of eccentricity (5) for surface number 5 in FIG. 7 are as shown in Table 17.

TABLE 17

| X | 0.0 | α | −69.1243297148 |
|---|---|---|---|
| Y | −12.9030603893 | β | 0.0 |
| Z | 6.97486591823 | γ | 0.0 |

The eccentricity parameters of eccentricity (6) for surface numbers 6 and 7 in FIG. 7, which are diffractive optical surfaces of the diffractive optical element 33, are as shown in Table 18.

TABLE 18

| X | 0.0 | α | −69.1243297148 |
|---|---|---|---|
| Y | −13.1030603893 | β | 0.0 |
| Z | 6.97486591823 | γ | 0.0 |

The eccentricity parameters of eccentricity (7) for surface number 8 in FIG. 7 are as shown in Table 19.

TABLE 19

| X | 0.0 | α | −69.1243297148 |
|---|---|---|---|
| Y | −13.3030603893 | β | 0.0 |
| Z | 6.97486591823 | γ | 0.0 |

The shape of the diffractive optical surface of the diffractive optical element 33 shown in Table 7 is determined by numerical relationship (9), and the coefficients are as shown in Table 20.

TABLE 20

| C3 | −0.0012 |
|---|---|
| C5 | −0.0009 |

TABLE 20-continued

| C10 | $-1.0 \times 10^{-7}$ |
|---|---|
| C14 | $-0.2 \times 10^{-6}$ |

The specific values of the parameters relating to numerical relationships (1) through (8) used to describe the first embodiment obtained using the above-mentioned parameters are as shown in Table 21.

TABLE 21

| fe | 18.8314 |
|---|---|
| Φs | 0.00157 |
| Φm | 0.00118 |
| δ | — |
| Eg | 0.98594 |
| EC | 0.98375 |
| Ee | 0.99563 |
| h(μm) | 20.000 |

TABLE 21-continued

| λe(μm) | 0.546074 |
|---|---|
| Φ(=1/fe) | 0.05310 |

According to the conditional values shown in Table 21, the calculation results relating to numerical relationships (1) through (8) are as shown in Table 22. The optical system 300 satisfies the conditions in numerical relationships (1) through (8) as shown in Table 22.

TABLE 22

| NUMERICAL RELATIONSHIP(1) | ΔNe | 0.0283 |
|---|---|---|
| NUMERICAL RELATIONSHIP(2) | Φs/Φ | 0.0295 |
| NUMERICAL RELATIONSHIP(3) | Φs/Φm | 1.33051 |
| NUMERICAL RELATIONSHIP(4) | δ/fe | — |
| NUMERICAL RELATIONSHIP(5) | (Eg + EC)/(2 × Ee) | 0.98917 |
| NUMERICAL RELATIONSHIP(6) | ΔNe/Δ(Ng − NC) | −6.1522 |
| NUMERICAL RELATIONSHIP(7) | Φm/Φ | 0.02222 |
| NUMERICAL RELATIONSHIP(8) | h/λe | 36.625 |

Figure 8:
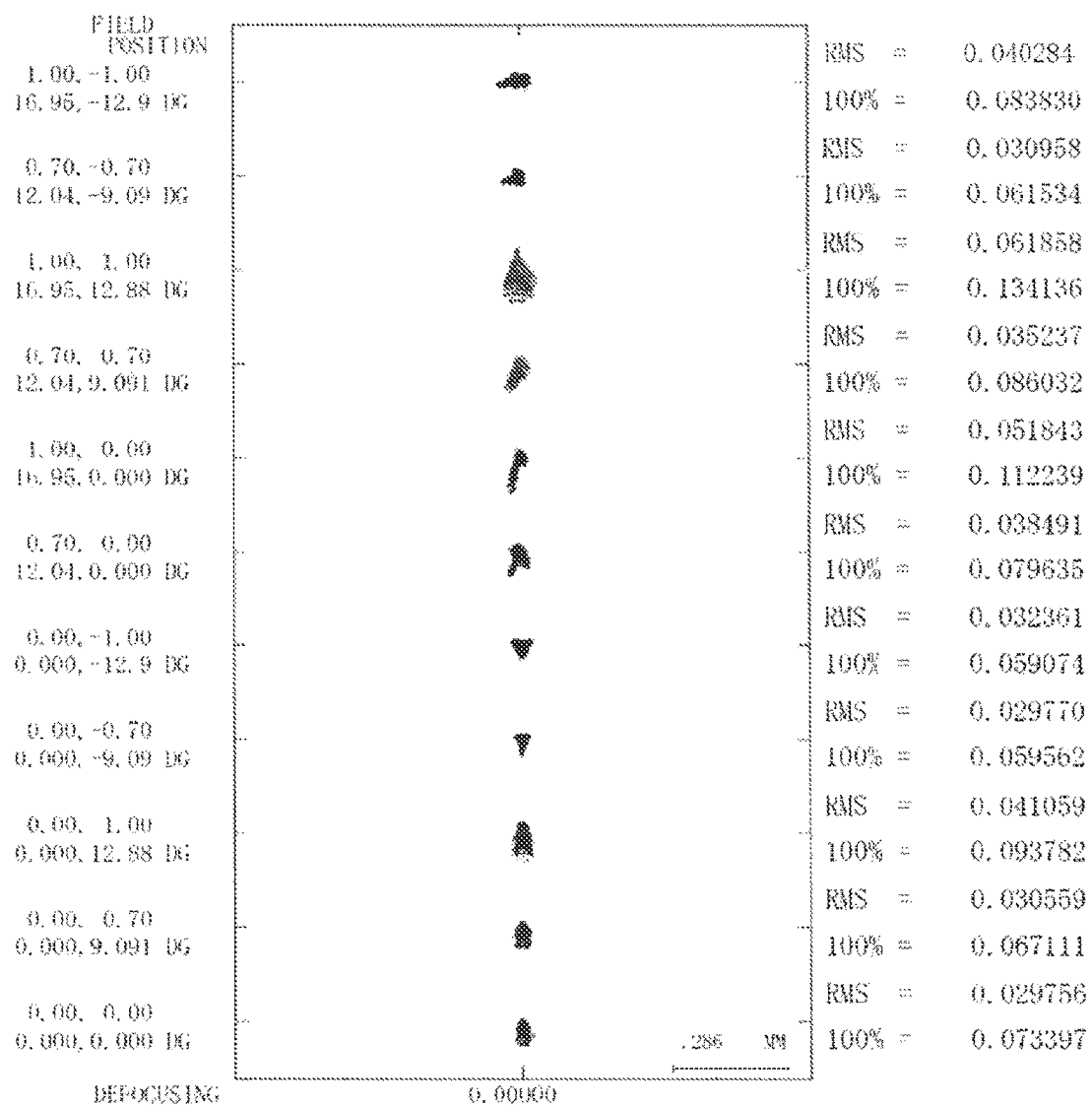
FIG. 8 is a spot diagram showing the state of aberration correction according to the third embodiment.

FIG. 8 is a spot diagram showing the state of aberration correction according to the third embodiment. As shown in FIG. 8, the diffractive optical element 33 sufficiently corrects the chromatic aberration generated on the transmission surfaces (first surface 121 and second surface 122) of the eccentric prism 12.

Fourth Embodiment

Overall Configuration of Optical System 400

Figure 9:
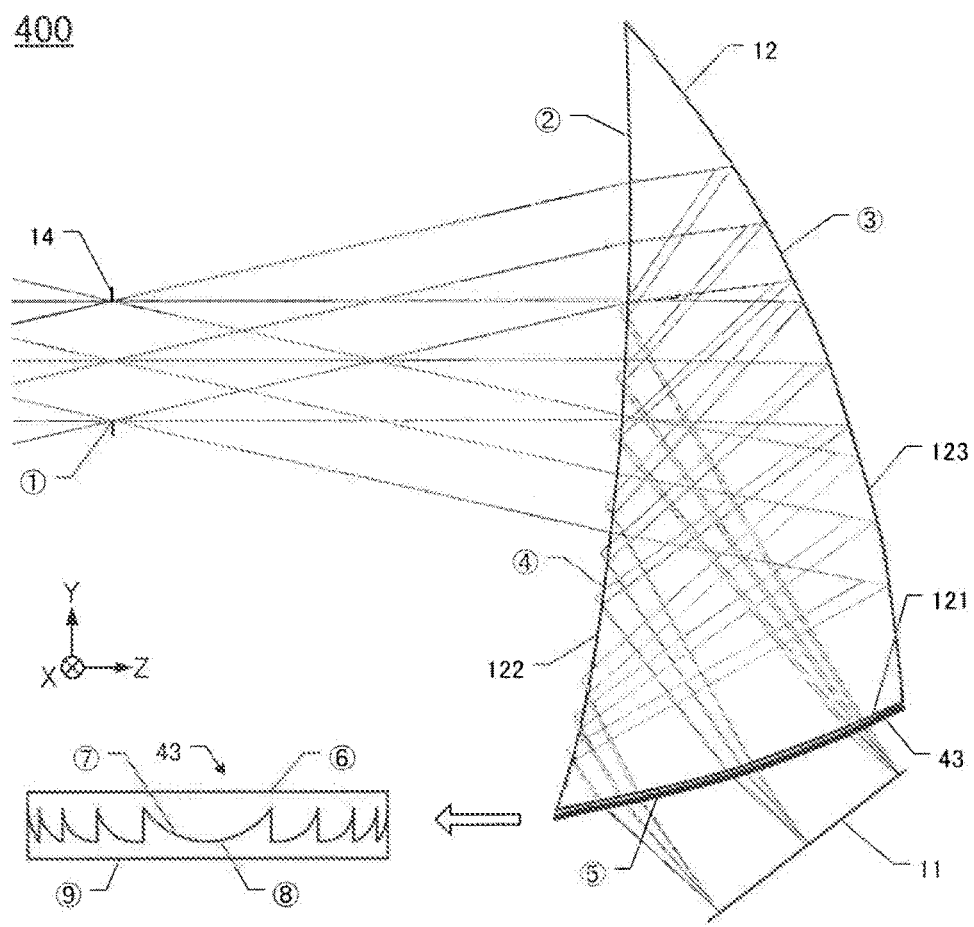
FIG. 9 is a side view of the optical system 400 according to the fourth embodiment.

The configuration of an optical system 400 according to a fourth embodiment will now be described with reference to FIG. 9. FIG. 9 is a side view of the optical system 400 according to the fourth embodiment. The image element 11 is not included in the optical system 400, but is illustrated in order to aid comprehension. Constituent elements described in the first embodiment are described using identical affixed numerals.

As shown in FIG. 9, a diffractive optical element 43 is formed so as to be in intimate contact with the first surface 121 of the eccentric prism 12. The diffractive optical element 43 is of a multilayer type obtained by bringing two diffraction gratings into intimate contact with each other, similar to the diffractive optical element 23 described in the second embodiment. However, the diffractive optical element 43 does not have the glass plate 23C indicated by a dotted line in FIG. 5 of the second embodiment. In the diffractive optical element 43, the side towards the image element 11 is a diffraction grating having a lower refractive index, and the side towards the eccentric prism 12 is a diffraction grating having a higher refractive index.

Specific Example of Optical System 400

Data representing the surface of the diffractive optical element 43 and the eccentric prism 12 forming the optical system 400 is as shown in Table 23. In Table 23, the surface numbers are in reference to FIG. 9.

TABLE 23

| SURFACE NUMBER | RADIUS OF CURVATURE | SURFACE DISTANCE | ECCEN-TRICITY | REFRACTIVE INDEX | | |
|---|---|---|---|---|---|---|
| | | | | g-LINE | c-LINE | e-LINE |
| OBJECT | ∞ | ∞ | — | | | |
| ① | ∞ | 20.0000 | — | | | |
| ② | −91.0742 FFS[1] | | ECCEN-TRICITY(1) | 1.526685 | 1.514322 | 1.518722 |
| ③ | −42.2454 FFS[2] | | ECCEN-TRICITY(2) | 1.526685 | 1.514322 | 1.518722 |
| ④(②) | −91.0742 FFS[1] | | ECCEN-TRICITY(1) | 1.526685 | 1.514322 | 1.518722 |
| ⑤ | −14.6424 FFS[3] | 0.0000 | ECCEN-TRICITY(3) | | | |
| ⑥ | −14.6424 FFS[3] | 0.1000 | ECCEN-TRICITY(3) | 1.5713 | 1.5538 | 1.5598 |
| ⑦ | −14.6424 FFS[3] | 0.0000 | ECCEN-TRICITY(8) | | | |
| ⑧ | −14.6424 FFS[3] | 0.1000 | ECCEN-TRICITY(8) | 1.5491 | 1.5233 | 1.5315 |
| ⑨ | −14.6424 FFS[3] | 1.5459 | ECCEN-TRICITY(9) | | | |
| IMAGE | ∞ | | ECCEN-TRICITY(4) | | | |

The coefficients of the polynomials FFS[1]-FFS[3] shown in Table 23 are as shown in Tables 2, 3, and 4 used to describe the first embodiment, respectively.

Eccentricities (1) through (4) are as shown in Tables 5, 6, 7, and 8 used to describe the first embodiment, respectively. In the fourth embodiment, the diffractive optical element 43 is in intimate contact with the first surface 121 of the eccentric prism 12; therefore, the eccentricity parameters of surface number 6 of the diffractive optical element 43 are the same as those for eccentricity (3) of the first surface 121.

The eccentricity parameters of eccentricity (8) for surface number 7 and surface number 8 in FIG. 9, which are diffractive optical surfaces of the diffractive optical element 43, are as shown in Table 24.

TABLE 24

| X | 0.0 | α | −69.1243297148 |
|---|---|---|---|
| Y | −15.2030603893 | β | 0.0 |
| Z | 6.97486591823 | γ | 0.0 |

The eccentricity parameters of eccentricity (9) for surface number 9 in FIG. 9 are as shown in Table 25.

TABLE 25

| X | 0.0 | α | −69.1243297148 |
|---|---|---|---|
| Y | −15.3030603893 | β | 0.0 |
| Z | 6.97486591823 | γ | 0.0 |

The shape of the diffractive optical surface of the diffractive optical element 43 shown in Table 9 is determined by numerical relationship (9), and the coefficients are as shown in Table 26.

TABLE 26

| C3 | −0.0012 |
|---|---|
| C5 | −0.0009 |
| C10 | $-1.0 \times 10^{-7}$ |
| C14 | $-0.2 \times 10^{-6}$ |

The specific values of the parameters relating to numerical relationships (1) through (8) used to describe the first embodiment obtained using the above-mentioned parameters are as shown in Table 27.

TABLE 27

| fe | 18.8392 |
|---|---|
| Φs | 0.00157 |
| Φm | 0.00118 |
| δ | — |
| Eg | 0.98594 |
| EC | 0.98375 |
| Ee | 0.99563 |
| h(μm) | 20.000 |
| λe(μm) | 0.546074 |
| Φ(=1/fe) | 0.05308 |

According to the conditional values shown in Table 27, the calculation results relating to numerical relationships (1) through (8) are as shown in Table 28. The optical system 400 satisfies the conditions in numerical relationships (1) through (8) as shown in Table 28.

TABLE 28

| NUMERICAL RELATIONSHIP(1) | ΔNe | 0.0283 |
|---|---|---|
| NUMERICAL RELATIONSHIP(2) | Φs/Φ | 0.0295 |
| NUMERICAL RELATIONSHIP(3) | Φs/Φm | 1.33051 |
| NUMERICAL RELATIONSHIP(4) | δ/fe | — |

TABLE 28-continued

| NUMERICAL RELATIONSHIP(5) | (Eg + EC)/(2 × Ee) | 0.98917 |
|---|---|---|
| NUMERICAL RELATIONSHIP(6) | ΔNe/Δ(Ng − NC) | −6.1522 |
| NUMERICAL RELATIONSHIP(7) | Φm/Φ | 0.02222 |
| NUMERICAL RELATIONSHIP(8) | h/λe | 36.625 |

Figure 10:
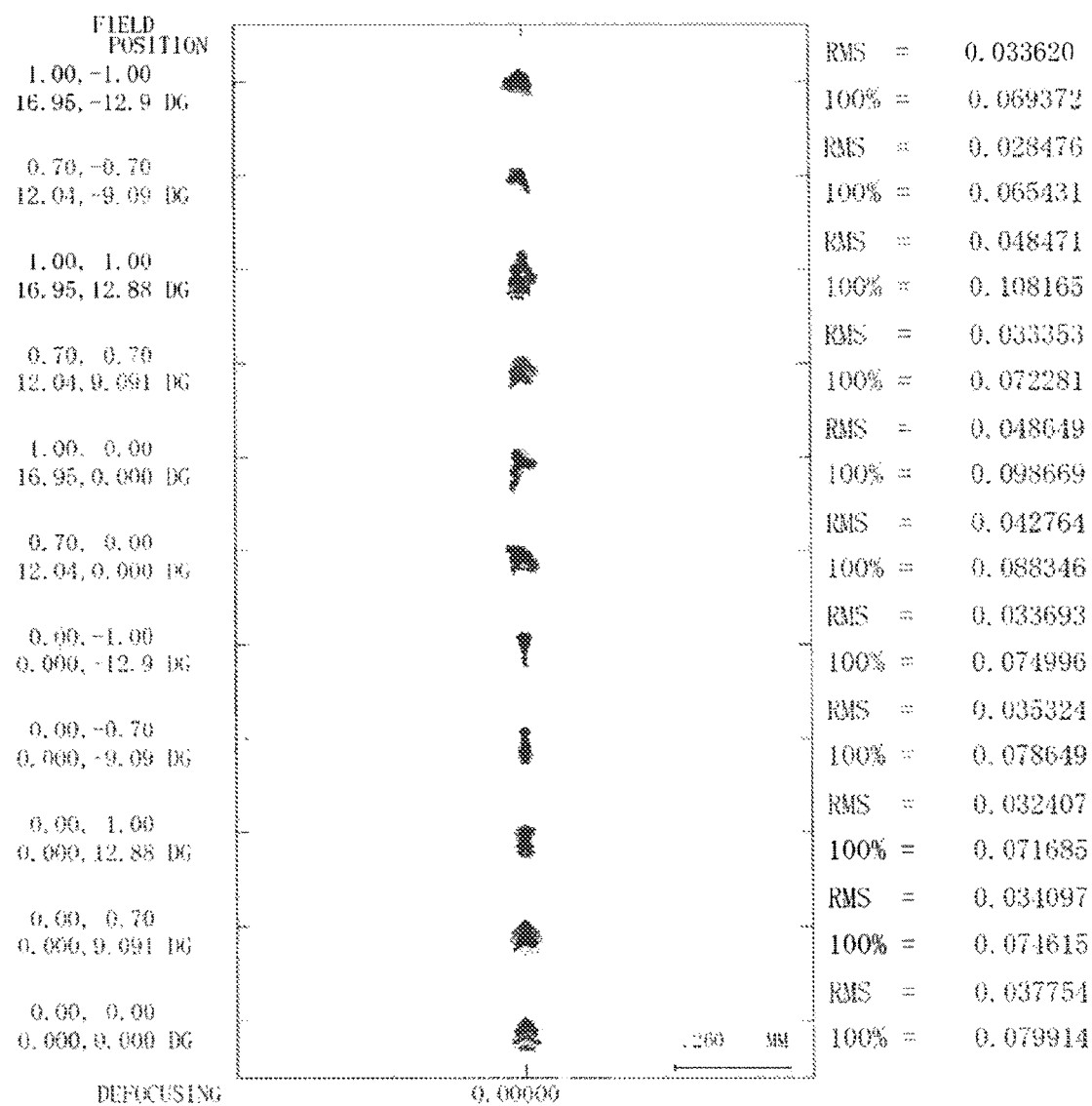
FIG. 10 is a spot diagram showing the state of aberration correction according to the fourth embodiment.

FIG. 10 is a spot diagram showing the state of aberration correction of the first embodiment. As shown in FIG. 10, the chromatic aberration generated on the transmission surfaces (first surface 121 and second surface 122) of the eccentric prism 12 is sufficiently corrected.

First Application Example

Image Display Device: Head-Mounted Image Display 50

Figure 11A:
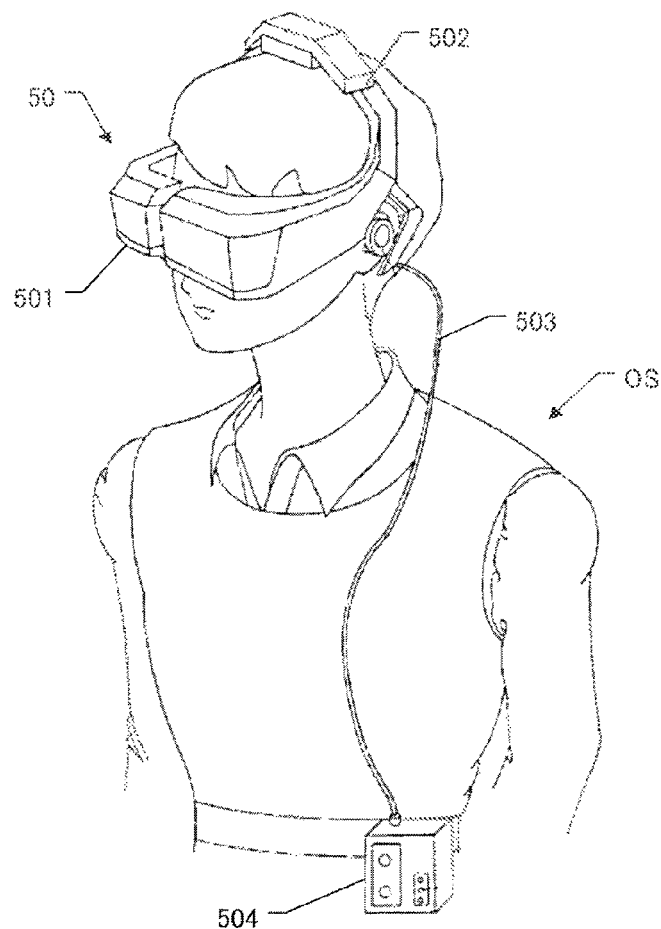
FIG. 11A is a perspective view showing the overall configuration of a head-mounted image display 50.
Figure 11B:
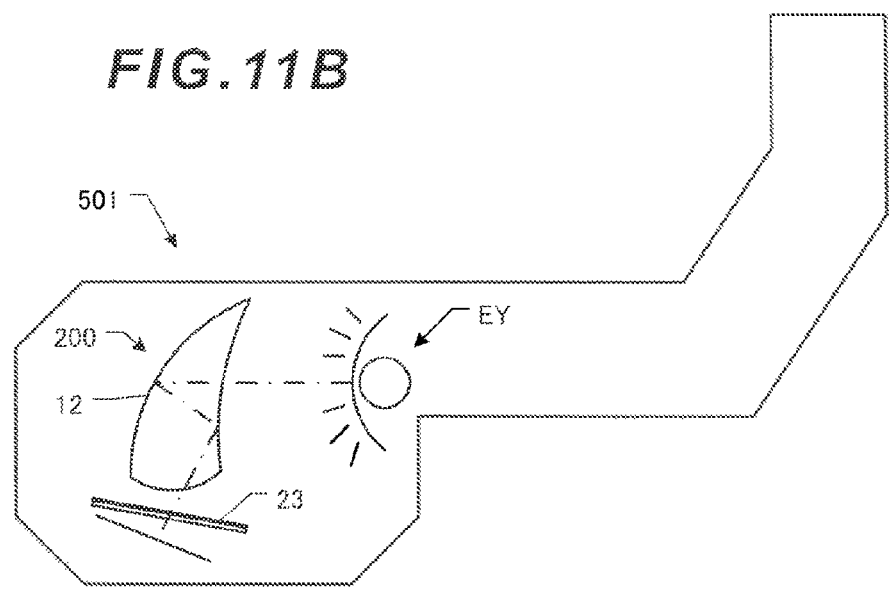
FIG. 11B is a side view of a main mounted body 501.

A description will now be given for a head-mounted image display (HMD) 50 as an example of an image display device according to a first application example, with reference to FIGS. 11A and 11B. FIG. 11A is a perspective view showing the overall configuration of the head-mounted image display 50, and FIG. 11B is a side view of a main mounted body 501.

As shown in FIG. 11A, the head-mounted image display 50 comprises the main mounted body 501 housing the optical system 200 described in the above-mentioned second embodiment, and a frame 502 that is continuous left and right from the main mounted body 501 and that secures the main body in front of the eyes of the observer OS. In FIG. 11B, the optical system 200 is arranged in the main mounted body 501 so that a person's eyeball EY is positioned at the stop 14 described in the above-mentioned second embodiment. In the first application example, the optical system 200 described in the second embodiment is used; however, the optical systems 100, 300, and 400 described in the first, third, and fourth embodiments may also be used.

According to a configuration of such description, the observer OS can observe an image in which chromatic aberration by the eccentric prism 12 has been corrected by the diffractive optical element 23.

As shown in FIG. 11A, the main mounted body 501 is connected, via an image transmission cord 503, to a displaying device 504 such as a portable video cassette and the like. The observer OS can hold the displaying device 504 to a desired position such as on a belt as illustrated, and view the image.

Second Application Example

Image Display Device—Projection Device 60

Figure 12:
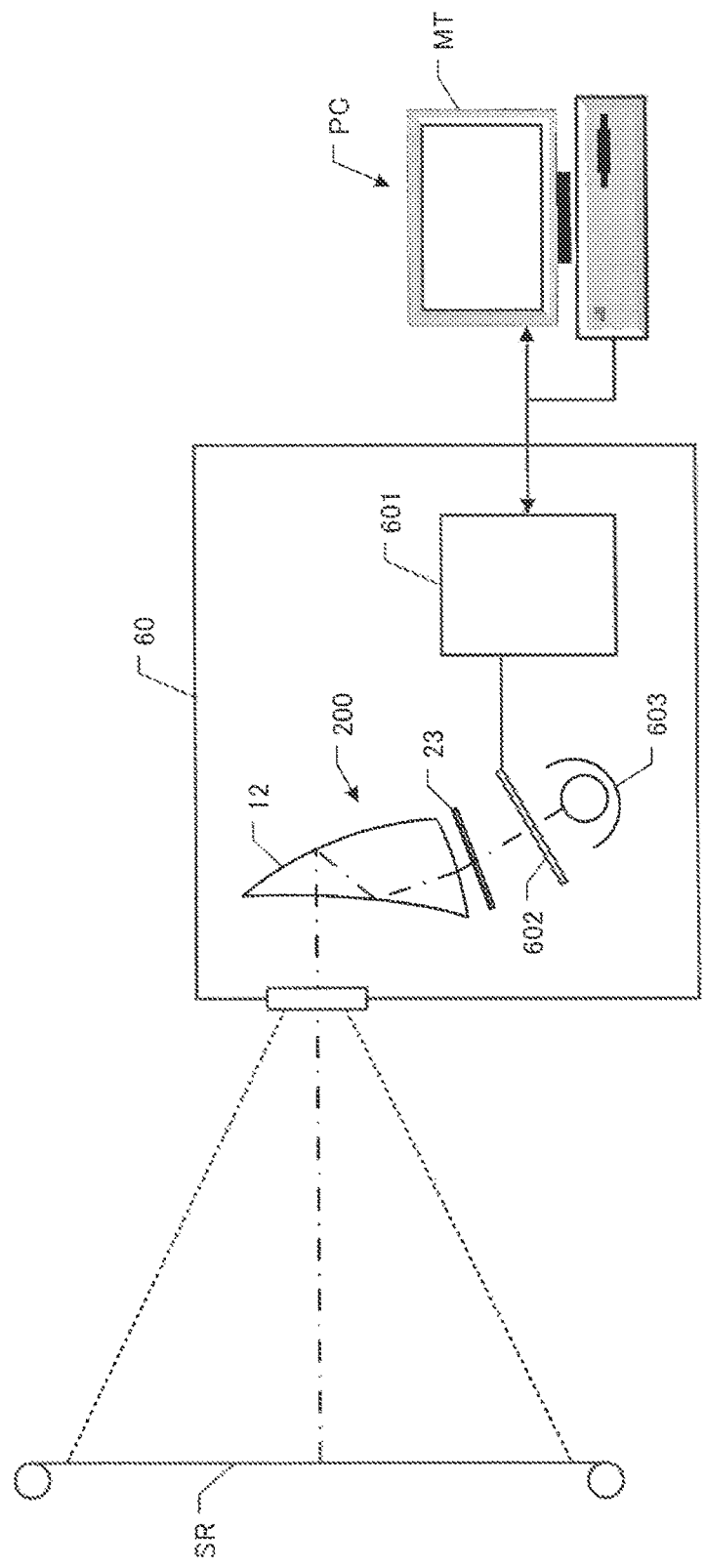
FIG. 12 is a schematic view showing the configuration of the projection device 60.

A description will now be given for a projection device 60 such as a projector as an example of an image display device according to a second application example, with reference to FIG. 12. In FIG. 12, a personal computer PC and a screen SR are illustrated in order to aid comprehension; however, the personal computer PC and the screen SR are not included in the projection device 60.

As shown in FIG. 12, the optical system 200 described in the above-mentioned second embodiment is used as a projection optical system of the projection device 60. In FIG. 12, image and text data created using the personal computer PC is branched from the output to a monitor MT and outputted to a process controller 601 of the projector 60. The process controller 601 of the projector 60 processes this inputted data and outputs the processed data to a liquid crystal panel 602. The liquid crystal panel 602 displays an image corresponding to the inputted image data. Light from a light source 603 has a transmission level thereof determined by the tone of the image displayed on the liquid crystal panel 602, and then projected onto the optical system 200 arranged directly in front of the liquid crystal panel 602.

A configuration of such description makes it possible for the observer to observe a projected image in which chromatic aberration by the eccentric prism 12 has been corrected by the diffractive optical element 23.

In the second application example, the optical system 200 described in the second embodiment is used as the projection optical system of the projection device 60; however, the optical systems 100, 300, and 400 described in the first, third, and fourth embodiments may also be used.

Third Application Example

Imaging Device—Camera 70

Figure 13A:
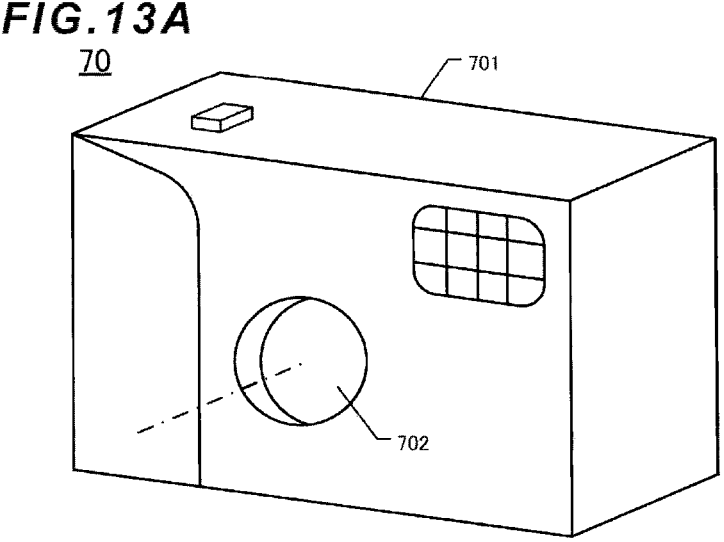
FIG. 13A is a perspective view showing the overall configuration of a camera 70.
Figure 13B:
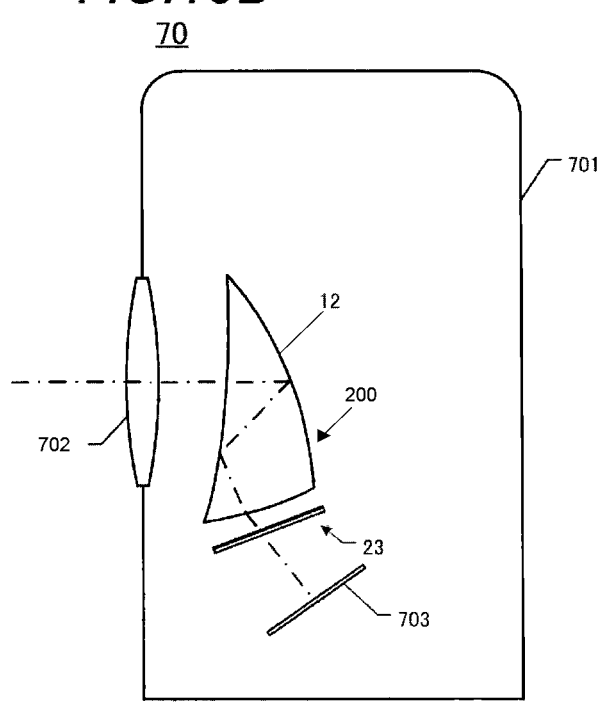
FIG. 13B is a schematic diagram showing the configuration of the camera 70.

A description will now be given for a camera 70 as an example of an imaging device according to a third application example, with reference to FIG. 13. FIG. 13A is a perspective view showing the overall configuration of the camera 70, and FIG. 13B is a schematic diagram showing the configuration of the camera 70.

As shown in FIG. 13A the camera 70 has a cubic main camera body 701 and an imaging optical system 702 arranged directly in front of the main camera body. As shown in FIG. 13B, light from a subject (not shown) passes through the imaging optical system 702 and is incident on the optical system 200. An image of the subject is imaged by a CCD or another imaging element 703 arranged on a light path of the optical system 200. The image of the subject, imaged by the imaging element 703, is displayed as an image via a processing means (not shown) on a liquid crystal display monitor (not shown) provided to the rear surface of the camera.

A configuration of such description makes it possible for the operator of the camera 70 to observe an image in which chromatic aberration by the eccentric prism 12 has been corrected by the diffractive optical element 23.

In the third application example, the optical system 200 described in the second embodiment is used as the camera 70; however, the optical systems 100, 300, and 400 described in the first, third, and fourth embodiments may also be used.

INDUSTRIAL APPLICABILITY

Preferred embodiments of the present invention have been described. As shall be apparent to a person skilled in the art, the present invention can be implemented through making a variety of modifications to the embodiments within the technical scope of the invention.

An optical system comprising a plurality of constituent elements obtained by incorporating the optical element of the present invention does not depart from the scope of the present invention. This also applies to an optical system obtained by incorporating a gradient index lens, a crystal material lens, or similar lenses.

Although in the present invention, a description was given for an intimate-contact type diffractive optical element obtained by bringing a pair of diffraction gratings into intimate contact with each other as a multilayer type diffractive optical element; however, the present invention is also applied to a separated type diffractive optical element in which the pair of diffraction gratings are separated from each other.

EXPLANATION OF NUMERALS AND CHARACTERS

11: image display element
12: prism
13, 13A, 13B, 23, 33, 43: diffractive optical element
14: entrance pupil
23A, 23B: diffraction grating
23C: glass plate
50: head-mounted image display
501: main mounted body
502: frame
503: image transmission cord
504: displaying device
60: projection device
601: process controller
602: liquid crystal panel
603: light source
70: camera
701: main camera body
702: imaging optical system
703: imaging element
100, 200, 300, 400: optical system
121: first surface
122: second surface
123: third surface
131, 231: diffractive surface
132, 232: edge surface
Ax: optical axis
DM: diffractive optical surface
h: height of diffractive optical element
CL1, CL2: contour lines
P1, P2, P3: spacing between edge surfaces
PC: personal computer
SR: screen
Os: observer
EY: eyeball
MT: monitor

The invention claimed is:

1. An optical system comprising an eccentric prism and a diffractive optical element; wherein
the eccentric prism has a non-rotationally-symmetric aspheric surface for correcting eccentric aberration;
the diffractive optical element is of a multilayer type having a first diffraction grating and a second diffraction grating with intimate contact with each other, and a diffractive optical surface formed by the first diffraction grating and the second diffraction grating has a lattice structure that is asymmetric about an optical axis of the optical system; and
the following condition (1) is satisfied where $\Delta Ne$ represents the refractive index difference of the diffractive optical surface in relation to the e-line (546.074 nm), $$0.53 > \Delta Ne > 0.005 \tag{1}$$

and further, the following condition (3) is satisfied, where:
$\Phi s$ represents the refractive power, in relation to the e-line, of a cross-section of the asymmetric lattice structure along which the paraxial power is the strongest; and $\Phi m$ represents the refractive power, in relation to the e-line, of the asymmetric lattice structure along which the paraxial power is the weakest $$5.0 > \Phi s/\Phi m > 1.02 \quad (3).$$

2. The optical system according to claim 1 wherein the following condition (2) is satisfied, where: Φs represents the refractive power, in relation to the e-line, of a cross-section of the asymmetric lattice structure along which the paraxial power is the strongest; and Φ represents the refractive power in relation to the e-line of the optical system as a whole, $$1 \times 10^{-1} > \Phi s/\Phi > 1 \times 10^{-7} \quad (2).$$

3. The optical system according to claim 1 wherein the following condition (4) is satisfied, where: δ represents the amount of eccentricity, relative to the optical axis of the optical system, of an optical axis of a cross-section of the asymmetric lattice structure along which the paraxial power is the strongest; and fe represents the focal distance, in relation to the e-line, of the optical system as a whole, $$2.0 > \delta/fe > 0.001 \quad (4).$$

4. The optical system according to claim 1 wherein the following condition (5) is satisfied, where: Ee represents the diffraction efficiency in relation to the e-line (546.074 nm), Eg represents the diffraction efficiency in relation to a g-line (435.8 nm), and EC represents the diffraction efficiency in relation to a C-line (656.3 nm), $$(Eg+EC)/(2 \times Ee) > 0.8 \quad (5).$$

5. The optical system according to claim 1, wherein:
light that has passed through the optical system is incident on a stop for adjusting the light amount;
the diffractive optical element has a higher refractive index at a portion nearer the stop; and
the diffractive optical element has a lower refractive index at a portion further from the stop.

6. The optical system according to claim 1, wherein:
light that has passed through a stop for adjusting the light amount is incident on the optical system;
the diffractive optical element has a higher refractive index at a portion nearer the stop; and
the diffractive optical element has a lower refractive index at a portion further from the stop.

7. The optical system according to claim 1, wherein the diffractive optical element is formed on the aspheric surface of the eccentric prism.

8. The optical system according to claim 1, wherein the material forming the diffractive optical element is a UV-curing resin.

9. An image display device comprising the optical system according to claim 1, and a display element for displaying an image guided through and formed by the optical system.

10. An image display device comprising the optical system according to claim 1, and an imaging element for imaging an image guided through and formed by the optical system.

11. The optical system according to claim 1, wherein the eccentric prism consists of only a single piece of material and the diffractive optical element is inside the eccentric prism.

12. The optical system according to claim 1,
wherein the following condition (2) is satisfied, where: Φs represents the refractive power, in relation to the e-line, of a cross-section of the asymmetric lattice structure along which the paraxial power is the strongest; and Φ represents the refractive power in relation to the e-line of the optical system as a whole, $$1 \times 10 - 1 > \Phi s/\Phi > 1 \times 10 - 7 \quad (2),$$

wherein the following condition (4) is satisfied, where: δ represents the amount of eccentricity, relative to the optical axis of the optical system, of an optical axis of a cross-section of the asymmetric lattice structure along which the paraxial power is the strongest; and fe represents the focal distance, in relation to the e-line, of the optical system as a whole, $$2.0 > \delta/fe > 0.001 \quad (4),$$

wherein the following condition (5) is satisfied, where: Ee represents the diffraction efficiency in relation to the e-line (546.074 nm), Eg represents the diffraction efficiency in relation to a g-line (435.8 nm), and EC represents the diffraction efficiency in relation to a C-line (656.3 nm), $$(Eg+EC)/(2 \times Ee) > 0.8 \quad (5)$$

13. The optical system according to claim 1,
wherein all surfaces of the eccentric prism are non-rotationally-symmetric aspheric surfaces.

14. An optical system comprising an eccentric prism consisting of only a single piece of material and a diffractive optical element; wherein
the eccentric prism has a first surface through which light enters into the eccentric prism, a second surface by which the light entered into the eccentric prism is internally reflected, and a third surface through which the internally reflected light is emitted,
at least one of the first, the second and the third surfaces is a non-rotationally-symmetric aspheric surface for correcting eccentric aberration;
the diffractive optical element is inside the eccentric prism and is of a multilayer type having a first diffraction grating and a second diffraction grating with intimate contact with each other, and a diffractive optical surface formed by the first diffraction grating and the second diffraction grating has a lattice structure that is asymmetric about an optical axis of the optical system; and
the following condition (1) is satisfied, where ΔNe represents the refractive index difference of the diffractive optical surface in relation to the e-line (546.074 nm), $$0.53 > \Delta Ne > 0.005 \quad (1).$$

15. The optical system according to claim 14 wherein the diffractive optical element is disposed so that the light internally reflected by the second surface passes through the diffractive optical element.

16. The optical system according to claim 14 wherein the following condition (2) is satisfied, where: Φs represents the refractive power, in relation to the e-line, of a cross-section of the asymmetric lattice structure along which the paraxial power is the strongest; and Φ represents the refractive power in relation to the e-line of the optical system as a whole, $$1 \times 10 - 1 > \Phi s/\Phi > 1 \times 10 - 7 \quad (2).$$

17. The optical system according to claim 14 wherein the following condition (3) is satisfied, where: Φs represents the refractive power, in relation to the e-line, of a cross-section of the asymmetric lattice structure along which the paraxial power is the strongest; and Φm represents the refractive power, in relation to the e-line, of the asymmetric lattice structure along which the paraxial power is the weakest, $$5.0 > \Phi s/\Phi m > 1.02 \quad (3).$$

18. The optical system according to claim 14 wherein the following condition (4) is satisfied, where: δ represents the amount of eccentricity, relative to the optical axis of the optical system, of an optical axis of a cross-section of the asymmetric lattice structure along which the paraxial power is the strongest; and fe represents the focal distance, in relation to the e-line, of the optical system as a whole, $$2.0 > \delta/fe > 0.001 \qquad (4).$$

19. The optical system according to claim 14 wherein the following condition (5) is satisfied, where: Ee represents the diffraction efficiency in relation to the e-line (546.074 nm), Eg represents the diffraction efficiency in relation to a g-line (435.8 nm), and EC represents the diffraction efficiency in relation to a C-line (656.3 nm), $$(Eg + EC)/(2 \times Ee) > 0.8 \qquad (5).$$

* * * * *